United States Patent
Li et al.

(10) Patent No.: US 11,682,148 B2
(45) Date of Patent: Jun. 20, 2023

(54) METHOD FOR DISPLAYING ADVERTISEMENT PICTURE, METHOD FOR UPLOADING ADVERTISEMENT PICTURE, AND APPARATUS

(71) Applicant: PETAL CLOUD TECHNOLOGY CO., LTD., Dongguan (CN)

(72) Inventors: Yang Li, Nanjing (CN); Yiliang He, Nanjing (CN); Huangang Pang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 17/056,516

(22) PCT Filed: Aug. 16, 2018

(86) PCT No.: PCT/CN2018/100847
§ 371 (c)(1),
(2) Date: Nov. 18, 2020

(87) PCT Pub. No.: WO2020/034150
PCT Pub. Date: Feb. 20, 2020

(65) Prior Publication Data
US 2021/0217062 A1     Jul. 15, 2021

(51) Int. Cl.
*G06T 11/60*     (2006.01)
*G06Q 30/0241*     (2023.01)
(Continued)

(52) U.S. Cl.
CPC .......... *G06T 11/60* (2013.01); *G06Q 30/0276* (2013.01); *G06T 3/40* (2013.01);
(Continued)

(58) Field of Classification Search
CPC ....... G06Q 30/0276; G06T 3/40; G06T 11/00; G06T 2200/16
See application file for complete search history.

(56) References Cited

U.S. PATENT DOCUMENTS

2003/0033380 A1* 2/2003 Kuriyama .......... H04N 21/4722
709/218
2004/0004641 A1 1/2004 Gargi
(Continued)

FOREIGN PATENT DOCUMENTS

CN     103903221 A     7/2014
CN     104021176 A     9/2014
(Continued)

*Primary Examiner* — Phi Hoang
(74) *Attorney, Agent, or Firm* — Conley Rose, P.C.

(57) ABSTRACT

A method for displaying an advertisement picture includes obtaining, by a terminal, location information of a first key information area in a first advertisement picture from an advertisement server, obtaining, by the terminal, the first advertisement picture, cropping, by the terminal, the first advertisement picture based on the location information, and displaying, by the terminal, a second advertisement picture in an advertisement display area of a display, where the second advertisement picture includes a second key information area, and the second advertisement picture is obtained after the first advertisement picture is cropped, or the second advertisement picture is a picture obtained by scaling the cropped first advertisement picture.

20 Claims, 25 Drawing Sheets

(51) Int. Cl.
*G06T 3/40* (2006.01)
*G06T 11/00* (2006.01)
*G06F 3/0482* (2013.01)
*G06F 3/04847* (2022.01)

(52) U.S. Cl.
CPC ............ *G06T 11/00* (2013.01); *G06F 3/0482* (2013.01); *G06F 3/04847* (2013.01); *G06T 2200/16* (2013.01); *G06T 2200/24* (2013.01)

(56) References Cited

U.S. PATENT DOCUMENTS

| | | |
|---|---|---|
| 2008/0144107 A1 | 6/2008 | Lieb |
| 2009/0170584 A1* | 7/2009 | Tan .................. G07F 17/32 463/16 |
| 2011/0173080 A1* | 7/2011 | Kutsumi ............ G06Q 30/0277 345/581 |
| 2014/0279032 A1* | 9/2014 | Roever .............. G06Q 30/0267 705/14.64 |
| 2015/0199708 A1* | 7/2015 | Ying .................. G06Q 30/0241 705/14.4 |
| 2016/0283096 A1 | 9/2016 | Yao et al. |
| 2017/0301117 A1* | 10/2017 | Lanza ..................... G06F 16/54 |
| 2018/0137542 A1* | 5/2018 | Pesavento ............. G06V 10/82 |
| 2018/0276722 A1* | 9/2018 | Fujita ................. G06Q 30/0277 |
| 2019/0075339 A1* | 3/2019 | Smith .............. H04N 21/25883 |
| 2019/0114678 A1* | 4/2019 | Touil ................. G06Q 30/0254 |

FOREIGN PATENT DOCUMENTS

| | | |
|---|---|---|
| CN | 104679906 A | 6/2015 |
| CN | 104952027 A | 9/2015 |
| CN | 105335925 A | 2/2016 |
| CN | 105589943 A | 5/2016 |
| CN | 105808587 A | 7/2016 |
| CN | 105917369 A | 8/2016 |
| CN | 108154515 A | 6/2018 |
| EP | 2293251 A1 | 3/2011 |
| JP | 2013115527 A | 6/2013 |
| KR | 20140111806 A | 9/2014 |
| WO | 2015124518 A1 | 8/2015 |

* cited by examiner

METHOD FOR DISPLAYING ADVERTISEMENT PICTURE, METHOD FOR UPLOADING ADVERTISEMENT PICTURE, AND APPARATUS

CROSS-REFERENCE TO RELATED APPLICATIONS

This application is a U.S. National Stage of International Patent Application No. PCT/CN2018/100847 filed on Aug. 16, 2018, which is hereby incorporated by reference in its entirety.

TECHNICAL FIELD

This application relates to the field of advertisement technologies, and in particular, to a method for displaying an advertisement picture, a method for uploading an advertisement picture, and an apparatus.

BACKGROUND

Usually, an advertiser uploads, to an advertisement server, an advertisement material (for example, an advertisement picture, video, and sound) that needs to be launched. When a user uses an application (APP), a terminal is triggered to obtain a corresponding advertisement material from the advertisement server, and display the advertisement material in a display interface of the terminal.

When the terminal detects that the user enables an app or enters a specified interface of an app, it may be considered that the terminal needs to display an advertisement at this time. Further, the terminal may send an advertisement request to the advertisement server. The advertisement server determines advertisement information (for example, an ID, a name, and an advertisement type of a target advertisement, and a download link of an advertisement material of the target advertisement) of the target advertisement matching the advertisement request, and returns the advertisement information to the terminal. In this case, the terminal may further obtain the advertisement material of the target advertisement from the advertisement server based on the advertisement information. For example, the terminal downloads the advertisement material of the target advertisement based on the download link of the advertisement material in the advertisement information, and then displays the advertisement material of the target advertisement in the display interface of the terminal.

Usually, a terminal for playing an advertisement may be a mobile phone or a tablet computer with a relatively low resolution, or may be a notebook computer or a television with a relatively high resolution. A resolution of a mobile phone varies with a mobile phone model. For example, a resolution of a mobile phone may be 1280×720, 1920×1080, 2560×1440, or the like. For example, an advertisement picture is displayed in full screen. When a size of the advertisement picture cannot adapt to a resolution of a terminal screen, the terminal may first crop the advertisement picture based on the resolution of the terminal screen, to display the advertisement picture in full screen. However, during cropping, the terminal may damage key information such as a trademark and contact information in the advertisement picture. Consequently, the key information cannot be completely displayed. This reduces a success rate of advertisement recommendation and worsens viewing experience of the user.

SUMMARY

This application provides a method for displaying an advertisement picture, a method for uploading an advertisement picture, and an apparatus, to reduce a loss rate of key information in the advertisement picture, improve a success rate of advertisement recommendation, and improve viewing experience of a user.

To achieve the foregoing objectives, the following technical solutions are used in this application.

According to a first aspect, this application provides a method for displaying an advertisement picture, including: obtaining, by a terminal, location information of a key information area in a first advertisement picture from an advertisement server, where the first advertisement picture includes at least one key information area; obtaining, by the terminal, the first advertisement picture; further, cropping, by the terminal, the first advertisement picture based on the location information; and displaying, by the terminal, a second advertisement picture in an advertisement display area of a display, where the second advertisement picture is obtained after the first advertisement picture is cropped, or the second advertisement picture is a picture obtained by scaling the cropped first advertisement picture, and the second advertisement picture includes at least one key information area. In other words, when displaying the advertisement picture, the terminal may first obtain the location information of the key information area in the advertisement picture from the advertisement server. In this way, when cropping the advertisement picture, the terminal can preferentially retain the key information area in the advertisement picture based on the location information of the key information area. In this way, key information in the key information area can be retained in an advertisement picture finally displayed by the terminal, so as to avoid a loss of the key information in the advertisement picture. This improves a success rate of advertisement recommendation and viewing experience of the user when the user views the advertisement.

In a possible design method, before the obtaining, by a terminal, location information of a key information area in a first advertisement picture from an advertisement server, the method further includes: sending, by the terminal, an advertisement request to the advertisement server; and in this case, the obtaining, by a terminal, location information of a key information area in a first advertisement picture from an advertisement server specifically includes: receiving, by the terminal, advertisement information that is of the first advertisement picture and that is sent by the advertisement server in response to the advertisement request, where the advertisement information carries location information of the at least one key information area. In other words, when the terminal initiates the advertisement request to the advertisement server, the advertisement server may carry the location information of the key information area in the advertisement information and deliver the advertisement information to the terminal.

In a possible design method, the advertisement information further includes a download address of the first advertisement picture; and in this case, the obtaining, by the terminal, the first advertisement picture includes: specifically includes: downloading, by the terminal, the first advertisement picture based on the download address.

In a possible design method, an aspect ratio of the second advertisement picture is the same as an aspect ratio of the advertisement display area. In this way, when the cropped second advertisement picture is subsequently displayed in the advertisement display area, the aspect ratio of the second advertisement picture is not changed, so that a relative location relationship between picture content in the second advertisement picture is not changed. This ensures a display effect of the advertisement picture during display.

In a possible design method, the cropping, by the terminal, the first advertisement picture based on the location information includes: determining, by the terminal based on the location information, a cropping line used to crop the first advertisement picture, where a shape of the cropping line is the same as a shape of the advertisement display area; and cropping, by the terminal, the first advertisement picture based on the cropping line, and retaining, as the second advertisement picture, a cropped part that has the same shape as the advertisement display area.

For example, the advertisement display area may be a rectangle, the location information of the key information area includes at least two pieces of coordinate information, and the coordinate information is used to indicate boundaries of the key information area in the first advertisement picture. In this case, the determining, by the terminal based on the location information, a cropping line used to crop the first advertisement picture specifically includes: determining, by the terminal in the first advertisement picture, an adjustment rectangle whose aspect ratio is the same as the aspect ratio of the advertisement display area; and adjusting, by the terminal, a location and a size of the adjustment rectangle in the first advertisement picture based on the coordinate information, and when the adjustment rectangle includes the key information area, determining, by the terminal, a boundary line of the adjustment rectangle as the cropping line.

In a possible design method, the first advertisement picture includes a first key information area and a second key information area, a priority of the first key information area is higher than that of the second key information area, and the second advertisement picture includes at least the first key information area. This minimizes loss of more important key information.

In a possible design method, the advertisement display area, the first key information area, and the second key information area are all rectangles, location information of the first key information area includes coordinate information of a vertex A1 in a top left corner of the first key information area and coordinate information of a vertex B1 in a lower right corner of the first key information area, and location information of the second key information area includes coordinate information of a vertex A2 in a top left corner of the second key information area and coordinate information of a vertex B2 in a lower right corner of the second key information area. The cropping, by the terminal, the first advertisement picture based on the location information specifically includes: determining, by the terminal, a maximum rectangle in the first advertisement picture that has the same aspect ratio as the advertisement display area; moving, by the terminal, the maximum rectangle in the first advertisement picture, to enable a vertex in a top left corner of the maximum rectangle to coincide with the point A1; and using, by the terminal, a boundary line of the maximum rectangle as the cropping line, and cropping the first advertisement picture based on the cropping line.

In a possible design method, the advertisement display area, the first key information area, and the second key information area are all rectangles, location information of the first key information area includes coordinate information of a vertex A1 in a top left corner of the first key information area and coordinate information of a vertex B1 in a lower right corner of the first key information area, and location information of the second key information area includes coordinate information of a vertex A2 in a top left corner of the second key information area and coordinate information of a vertex B2 in a lower right corner of the second key information area. The cropping, by the terminal, the first advertisement picture based on the location information specifically includes: if a horizontal coordinate of the point A1 is less than a horizontal coordinate of the point A2, and a vertical coordinate of the point B1 is less than a horizontal coordinate of the point B2, determining, by the terminal, the point A1 as a vertex in a top left corner of the adjustment rectangle; adjusting, by the terminal, a vertex in a lower right corner of the adjustment rectangle based on the aspect ratio of the advertisement display area, until the vertex in the lower right corner of the adjustment rectangle coincides with a boundary line of the first advertisement picture; and using, by the terminal, a boundary line of the adjustment rectangle as the cropping line, and cropping the first advertisement picture based on the cropping line.

According to a second aspect, this application provides a method for uploading an advertisement picture, including: displaying, by a terminal, an advertisement creation interface, where an upload area for uploading an advertisement picture is set in the advertisement creation interface; receiving, by the terminal, an upload operation of uploading a first advertisement picture in the upload area by a user; displaying, by the terminal, the first advertisement picture in the advertisement creation interface in response to the upload operation, and sending the first advertisement picture to an advertisement server for storage; subsequently, receiving, by the terminal, a marking operation of marking a key information area in the first advertisement picture by the user; and sending, by the terminal in response to the marking operation, coordinate information corresponding to the marking operation to the advertisement server, so that the advertisement server determines location information of the key information area in the first advertisement picture. In other words, when uploading the advertisement picture, the user (for example, an advertiser) may manually mark the key information area in the advertisement picture. After determining the location information of the key information area, the advertisement server may deliver the location information to the terminal when subsequently displaying the advertisement picture. In this way, when cropping the advertisement picture, the terminal maximally retains of the key information area marked by the user, and the user can also obtain customized and personalized experience when uploading the advertisement picture.

In a possible design method, the key information area may be an area that is in the first advertisement picture and that includes a trademark, a commodity image, a face, a text, or a phone number.

In a possible design method, after the displaying, by the terminal, the first advertisement picture in the advertisement creation interface, the method further includes: identifying, by the terminal, a candidate key area in the first advertisement picture, and displaying the identified candidate key area in the first advertisement picture, where in this case, the marking operation is an operation of adjusting a size and/or a location of the candidate key area in the first advertisement picture by the user, and the adjusted candidate key area is the key information area.

In a possible design method, after the displaying, by the terminal, the first advertisement picture in the advertisement creation interface, the method further includes: displaying, by the terminal, a toolbar used to mark a key information area, where the toolbar includes at least one tool button; and the marking operation is an operation of marking the key information area in the first advertisement picture by using the tool button after the user selects the tool button.

In a possible design method, after the receiving, by the terminal, a marking operation of marking a key information area in the first advertisement picture by the user, the method further includes: displaying, by the terminal, a priority menu, where the priority menu is used to set a priority of a marked key information area; receiving, by the terminal, a setting operation of setting a priority for the key information area in the priority menu by the user; and sending, by the terminal in response to the setting operation, priority information that is set for the key information area by the user to the advertisement server, so that the advertisement server establishes a correspondence between the key information area and the priority information. In this way, the terminal may preferentially retain a key information area with a high priority when subsequently cropping the first advertisement picture.

In a possible design method, after the sending, by the terminal, coordinate information corresponding to the marking operation to the advertisement server, the method further includes: receiving, by the terminal, a submission operation performed by the user in the advertisement creation interface for submitting an advertisement; and sending, by the terminal, an advertisement creation instruction to the advertisement server in response to the submission operation, so that the advertisement server generates advertisement information of the first advertisement picture, where the advertisement information includes the location information of the key information area.

According to a third aspect, this application provides a terminal, including a processor, a display coupled to the processor, and a communications module. The communications module is configured to: obtain location information of a key information area in a first advertisement picture from an advertisement server, where the first advertisement picture includes at least one key information area; and obtain the first advertisement picture. The processor is configured to crop the first advertisement picture based on the location information. The display is configured to display a second advertisement picture in an advertisement display area, where the second advertisement picture includes at least one key information area, and the second advertisement picture is obtained after the first advertisement picture is cropped, or the second advertisement picture is a picture obtained by scaling the cropped first advertisement picture.

In a possible design method, the communications module is further configured to: send an advertisement request to the advertisement server; and receive advertisement information that is of the first advertisement picture and that is sent by the advertisement server in response to the advertisement request, where the advertisement information carries location information of the at least one key information area.

In a possible design method, the advertisement information further includes a download address of the first advertisement picture. When the communications module obtains the first advertisement picture, the method specifically includes: downloading the first advertisement picture based on the download address.

In a possible design method, when the processor crops the first advertisement picture based on the location information, the method specifically includes: determining, based on the location information, a cropping line used to crop the first advertisement picture, where a shape of the cropping line is the same as a shape of the advertisement display area; and cropping the first advertisement picture based on the cropping line, and retaining, as a second advertisement picture, a cropped part that has the same shape as the advertisement display area.

In a possible design method, the advertisement display area is a rectangle, the location information of the key information area includes at least two pieces of coordinate information, and the coordinate information is used to indicate a boundary of the key information area in the first advertisement picture. The processor is specifically configured to: determine, in the first advertisement picture, an adjustment rectangle whose aspect ratio is the same as the aspect ratio of the advertisement display area; and adjust a location and a size of the adjustment rectangle in the first advertisement picture based on the coordinate information, and when the adjustment rectangle includes the key information area, the terminal determines a boundary line of the adjustment rectangle as the cropping line.

In a possible design method, the first advertisement picture includes a first key information area and a second key information area, a priority of the first key information area is higher than that of the second key information area, and the second advertisement picture includes at least the first key information area.

In this case, if the advertisement display area, the first key information area, and the second key information area are all rectangles, location information of the first key information area includes coordinate information of a vertex A1 in a top left corner of the first key information area and coordinate information of a vertex B1 in a lower right corner of the first key information area, and location information of the second key information area includes coordinate information of a vertex A2 in a top left corner of the second key information area and coordinate information of a vertex B2 in a lower right corner of the second key information area. In this case, the processor is specifically configured to: determine a maximum rectangle in the first advertisement picture that has the same aspect ratio as the advertisement display area; move the maximum rectangle in the first advertisement picture, to enable a vertex in a top left corner of the maximum rectangle to coincide with the point A1; and use a boundary line of the maximum rectangle as the cropping line, and crop the first advertisement picture based on the cropping line.

Alternatively, the processor is specifically configured to: if a horizontal coordinate of the point A1 is less than a horizontal coordinate of the point A2, and a vertical coordinate of the point B1 is less than a horizontal coordinate of the point B2, determine the point A1 as a vertex in a top left corner of the adjustment rectangle; adjust a vertex in a lower right corner of the adjustment rectangle based on the aspect ratio of the advertisement display area, until the vertex in the lower right corner of the adjustment rectangle coincides with a boundary line of the first advertisement picture; and use a boundary line of the adjustment rectangle as the cropping line, and crop the first advertisement picture based on the cropping line.

According to a fourth aspect, this application provides a terminal, including a processor, a display coupled to the processor, an input device, and a communications module. The display is configured to display an advertisement creation interface, where an upload area for uploading an advertisement picture is set in the advertisement creation interface. The input device is configured to receive an upload operation of uploading a first advertisement picture in the upload area by a user. The processor is configured to display the first advertisement picture in the advertisement creation interface in response to the upload operation, and send the first advertisement picture to an advertisement server for storage. The input device is further configured to receive a marking operation of marking a key information area in the first advertisement picture by the user. The processor is further configured to: in response to the marking operation, indicate the communications module to send coordinate information corresponding to the marking operation to the advertisement server, so that the advertisement server determines location information of the key information area in the first advertisement picture.

In a possible design method, the processor is further configured to: identify a candidate key area in the first advertisement picture, and display the identified candidate key area in the first advertisement picture, where the marking operation is an operation of adjusting a size and/or a location of the candidate key area in the first advertisement picture by the user, and the adjusted candidate key area is the key information area.

In a possible design method, the display is further configured to display a toolbar used to mark a key information area, where the toolbar includes at least one tool button; and the marking operation is an operation of marking the key information area in the first advertisement picture by using the tool button after the user selects the tool button.

In a possible design method, the display is further configured to display a priority menu, where the priority menu is used to set a priority of a marked key information area. The input device is further configured to receive a setting operation of setting a priority for the key information area in the priority menu by the user. The processor is further configured to, in response to the setting operation, indicate the communications module to send priority information that is set for the key information area by the user to the advertisement server, so that the advertisement server establishes a correspondence between the key information area and the priority information.

In a possible design method, the input device is further configured to receive a submission operation performed by the user in the advertisement creation interface for submitting an advertisement. The processor is further configured to indicate the communications module to send an advertisement creation instruction to the advertisement server in response to the submission operation, so that the advertisement server generates advertisement information of the first advertisement picture, where the advertisement information includes the location information of the key information area.

According to a fifth aspect, this application provides a graphical user interface (GUI). The graphical user interface is stored in a terminal. The terminal includes a touchscreen, a memory, and one or more processors. The one or more processors are configured to execute one or more computer programs stored in the memory. The graphical user interface includes a first GUI displayed on the touchscreen, where the first GUI includes an advertisement creation interface, and an upload area for uploading an advertisement picture is set in the advertisement creation interface; a second GUI displayed on the touchscreen in response to an upload operation of uploading a first advertisement picture to the upload area by a user, where the second GUI includes the first advertisement picture; and a third GUI displayed on the touchscreen in response to a marking operation of marking a key information area in the first advertisement picture by the user, where the third GUI includes at least one key information area located in the first advertisement picture.

In a possible design method, after the third GUI is displayed on the touchscreen, the graphical user interface includes: a fourth GUI displayed on the touchscreen, where the fourth GUI includes a priority menu, and the priority menu is used to set a priority of a marked key information area.

According to a sixth aspect, this application provides a computer storage medium, including a computer instruction. When the computer instruction is run on a terminal, the terminal is enabled to perform the method for displaying an advertisement picture or the method for uploading an advertisement picture according to any one of the foregoing descriptions.

According to a seventh aspect, this application provides a computer program product. When the computer program product runs on a computer, the computer is enabled to perform the method for displaying an advertisement picture or the method for uploading an advertisement picture according to any one of the foregoing descriptions.

It may be understood that the terminal according to the third aspect and the fourth aspect, the GUI according to the fifth aspect, the computer storage medium according to the sixth aspect, and the computer program product according to the seventh aspect are all used to perform the corresponding method provided above. Therefore, for beneficial effects that the terminal, the GUI, the computer storage medium, and the computer program product can achieve, refer to beneficial effects in the corresponding method provided above. Details are not described herein.

DESCRIPTION OF EMBODIMENTS

The following describes the implementations of the embodiments of this application in detail with reference to accompanying drawings.

Figure 1:
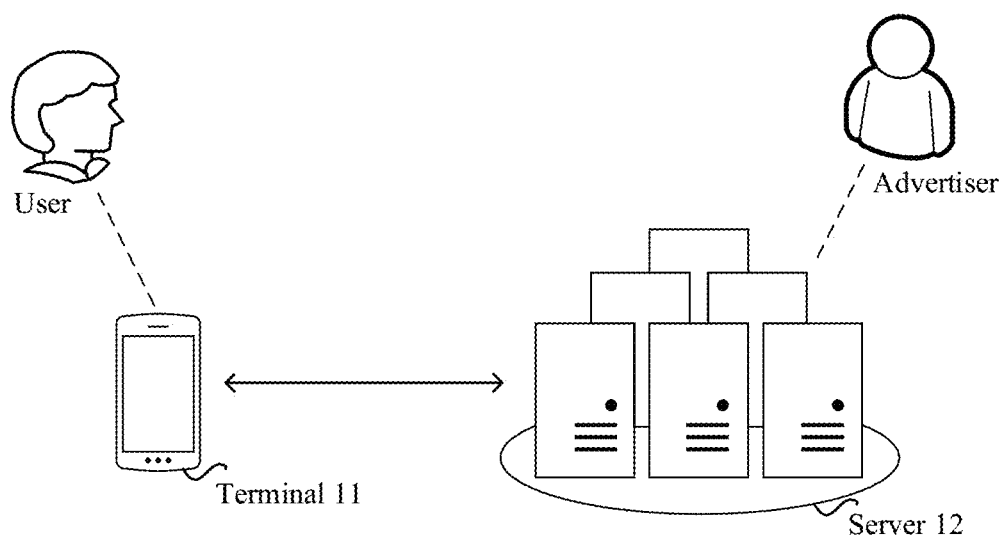
FIG. 1 is a schematic architectural diagram of an advertisement system according to an embodiment of this application.

A message transmission method provided in an embodiment of this application may be applied to an advertisement system shown in FIG. 1. The system may include one or more terminals 11 and one or more servers 12 (for example, an advertisement server).

The server 12 may be configured to maintain an advertisement resource pool. The advertisement resource pool stores advertisement materials (for example, materials such as a text, a picture, a video, and a sound that appear in an advertisement) uploaded by advertisers. The advertisement resource pool may further store advertisement information (for example, an advertisement type and a link address of the advertisement material) of the advertisement material. Usually, a server storing an advertisement material may be different from a server storing advertisement information.

In this case, when running an app, the terminal 11 may request a corresponding advertisement material from the server 12. For example, in a process in which a user watches a video by using a video application, when it is detected that the user triggers a pause button, the terminal 11 may send an advertisement request to the server 12, so that the server 12 returns advertisement information corresponding to the advertisement request to the terminal 11. In this way, the terminal 11 may obtain a corresponding advertisement material from the advertisement resource pool based on the advertisement information, and display the obtained advertisement material on a current video pause interface.

The advertisement information is a description parameter used to indicate a feature attribute of a to-be-played advertisement, for example, an ID of the advertisement, a name, an advertisement type, and a link address of the advertisement material. This is not limited in the embodiments of this application.

Correspondingly, the advertisement material refers to specific advertisement content displayed in a display interface of the terminal 11, for example, a text, a picture, a video, and a sound that appear in an advertisement. This is not limited in the embodiments of this application either.

Figure 2:
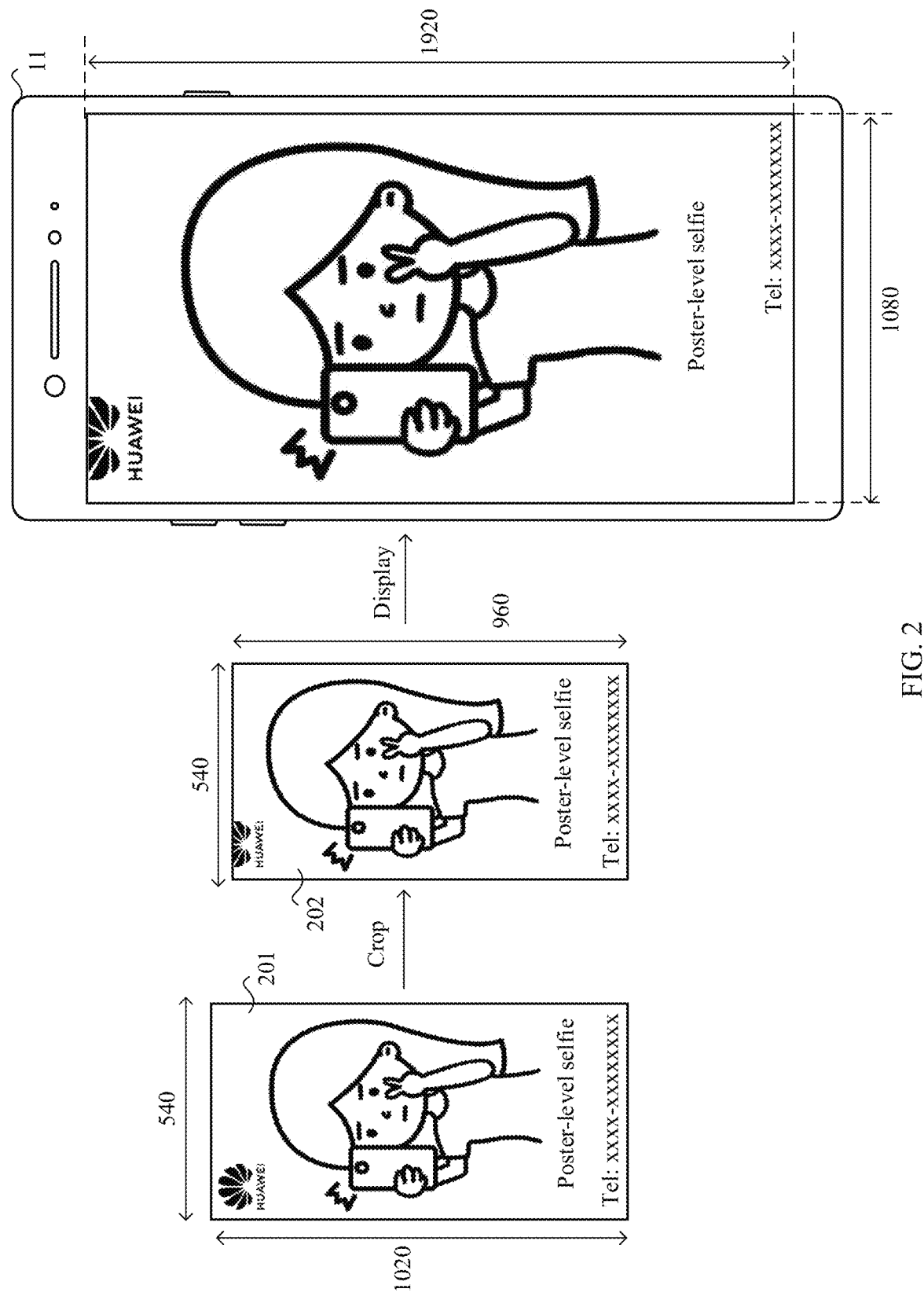
FIG. 2 is a schematic scenario diagram of displaying an advertisement picture in the prior art.

For example, as shown in FIG. 2, displaying an advertisement picture 201 on the terminal 11 is used as an example. The advertisement picture 201 is usually uploaded by an advertiser to the server 12. Therefore, a size of the advertisement picture 201 stored in the advertisement resource pool is usually fixed. For example, the size of the advertisement picture 201 is 540×1020, where 540×1020 is a resolution of the advertisement picture 201, and a unit of the resolution is pixel (pixel). In other words, a quantity of horizontal pixels in the advertisement picture 201 is 540, and a quantity of vertical pixels in the advertisement picture 201 is 1020. In this case, an aspect ratio of the advertisement picture 201 means that a ratio of the quantity of horizontal pixels to the quantity of vertical pixels in the advertisement picture 201 is 540:1020 (that is, 9:17).

In addition, the terminal 11 may set, on a screen, an advertisement display area used to display an advertisement picture. A size, a location, and a shape of an advertisement display area 501 in the display 194 may change correspondingly with advertisements being played. For example, the advertisement display area 501 may occupy the entire screen (that is, full-screen display), or the advertisement display area 501 may occupy a part of the screen. Similar to the resolution of the advertisement picture 201, a resolution of the advertisement display area is also jointly defined by a quantity of horizontal pixels and a quantity of vertical pixels. An aspect ratio of the advertisement display area is a ratio of the quantity of horizontal pixels to the quantity of vertical pixels in the advertisement display area. As shown in FIG. 2, that the entire screen of the terminal 11 is an advertisement display area is used as an example. In this case, a resolution of the advertisement display area is 1080×1920, and an aspect ratio of the advertisement display area is 1080:1920 (that is, 9:16). It should be noted that when a placement form of the terminal 11 changes, the aspect ratio of the advertisement display area of the terminal 11 changes accordingly. Still as shown in FIG. 2, that the entire screen of the terminal 11 is an advertisement display area is used as an example. When the terminal 11 is in portrait mode, an aspect ratio of the advertisement display area is 1080:1920. When the terminal 11 is in landscape mode, an aspect ratio of the advertisement display area is 1920:1080.

Because the aspect ratio 9:17 of the advertisement picture 201 is different from the aspect ratio 9:16 of the screen (that is, the aspect ratio of the advertisement display area) of the terminal 11, to display the advertisement picture 201 in full screen on the display of the terminal 11, the terminal 11 may crop the advertisement picture 201. In the prior art, as shown in FIG. 2, the terminal 11 may crop the advertisement picture 201 based on the aspect ratio 9:16 of the display of the terminal 11, to obtain a cropped advertisement picture 202 of 540×960. In other words, an aspect ratio of the cropped advertisement picture 202 is equal to the aspect ratio of the display of the terminal 11, and both are 9:16. Further, still as shown in FIG. 2, the terminal 11 may double the size of the advertisement picture 202 of 540×960 based on a ratio of 9:16 to obtain a picture of 1080×1920, so that the picture of 1080×1920 can be displayed in full screen on the display of the terminal 11.

However, when cropping the advertisement picture 201, the terminal 11 may cut out some key information in the advertisement picture 201. For example, in the advertisement picture 202 shown in FIG. 2, a part of a trademark pattern is cut out. In this case, the terminal 11 loses key information in the advertisement picture when displaying the advertisement picture. This reduces a success rate of advertisement recommendation and worsens using experience of the user.

Figure 3:
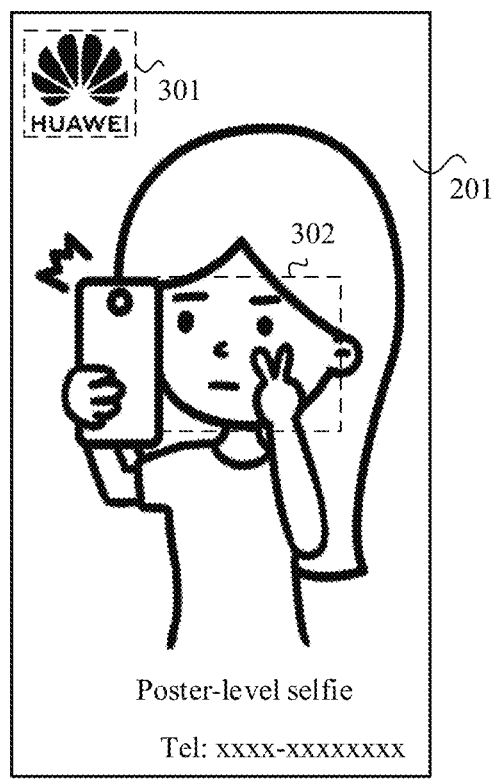
FIG. 3 is a schematic diagram of a key information area in an advertisement picture according to an embodiment of this application.

Therefore, in this embodiment of this application, when uploading the advertisement picture to the server 12, the advertiser may identify a key information area in the advertisement picture. For example, as shown in FIG. 3, when uploading the advertisement picture 201, the advertiser may manually mark an area 301 including a trademark and an area 302 including a face that are in the advertisement picture 201 as key information areas. Subsequently, when sending the advertisement information or the advertisement material of the advertisement picture 201 to the terminal 11, the server 12 may further send location information of the key information areas to the terminal 11. In this way, when cropping the advertisement picture 201, the terminal 11 may preferentially retain the key information areas in the advertisement picture 201 based on the location information of the key information areas. In this way, key information in the key information areas can be retained in an advertisement picture finally displayed by the terminal 11, so as to avoid a loss of the key information in the advertisement picture. This improves a success rate of advertisement recommendation and viewing experience of the user when the user views the advertisement.

The key information area may be an area, in an advertisement picture, that includes information such as a trademark, a commodity image, a phone number, a text, or a face. This is not limited in the embodiments of this application.

In addition, in the embodiments of this application, a size of a picture or a size of a display area (for example, the display) each is defined by using a pixel (pixel) as a unit. A person skilled in the art may also define a size of a picture or a size of a display area by using another unit. This is not limited in the embodiments of this application.

In specific implementation, the terminal 11 may be a device having a display function, such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, or a virtual reality device. A specific form of the terminal is not specially limited in the embodiments of this application.

Figure 4:
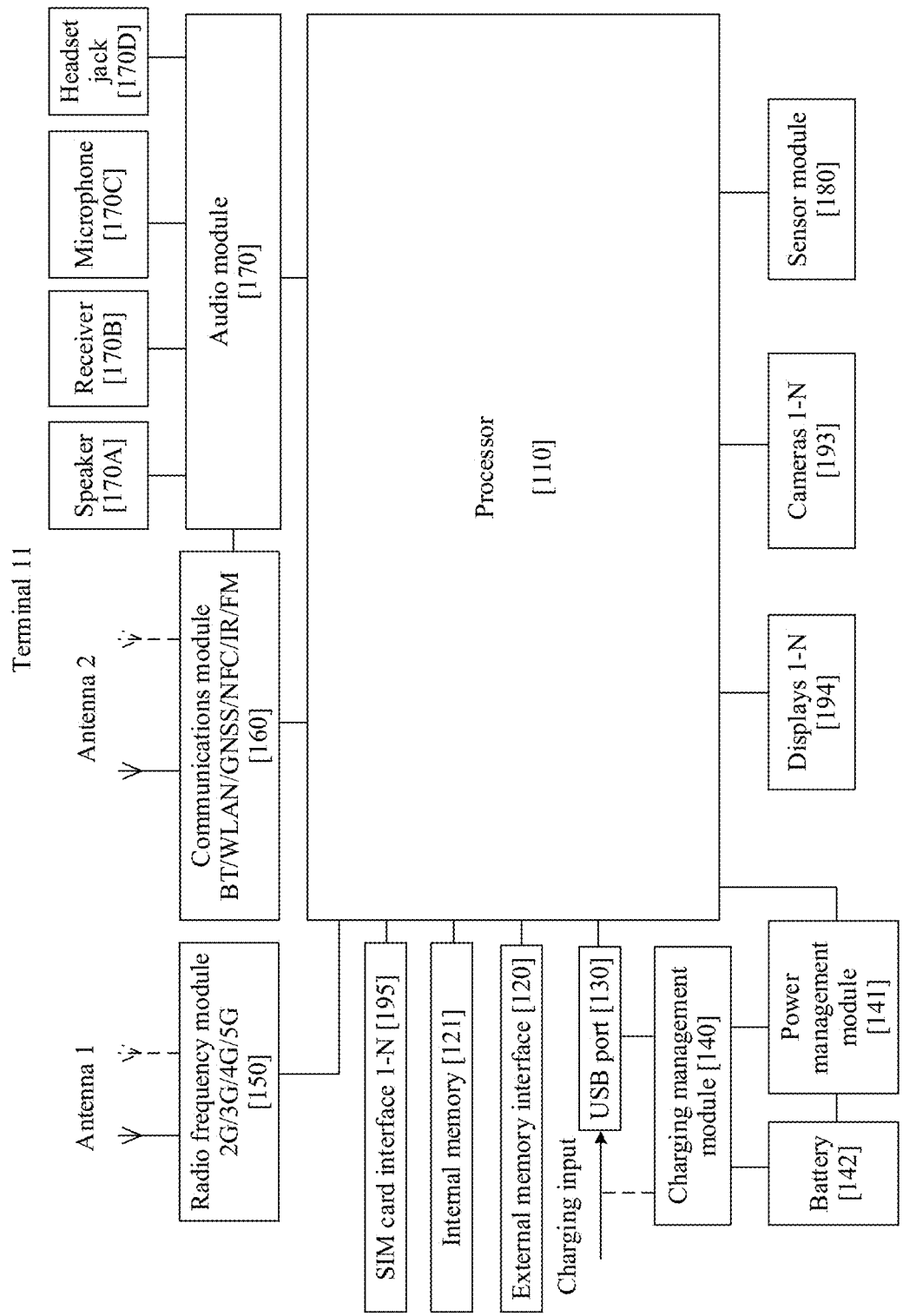
FIG. 4 is a schematic structural diagram 1 of a terminal according to an embodiment of this application.

FIG. 4 is a structural block diagram of the terminal 11.

The terminal 11 may include a processor 110, an external memory interface 120, an internal memory 121, a USB interface 130, a charging management module 140, a power management module 141, a battery 142, an antenna 1, an antenna 2, a radio frequency module 150, a communications module 160, an audio module 170, a speaker 170A, a receiver 170B, a microphone 170C, a headset interface 170D, a sensor module 180, a camera 193, a display 194, a SIM card interface 195, and the like.

A structure shown in the embodiments of the present invention does not constitute a limitation on the terminal 11. The terminal 11 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (Neural-network Processing Unit, NPU), and/or the like. Different processing units may be independent components, or may be integrated into one or more processors.

The controller may be a decision maker that instructs components of the terminal 11 to coordinate work based on an instruction, and is a nerve center and a command center of the terminal 11. The controller generates an operation control signal based on instruction operation code and a time sequence signal, to complete control of instruction reading and instruction execution.

A memory may be further disposed in the processor 110, and is configured to store an instruction and data. In some embodiments, the memory in the processor is a cache, and may store an instruction or data that has been used or cyclically used by the processor. If the processor needs to use the instruction or the data again, the processor may directly invoke the instruction or the data from the memory. This avoids repeated access and reduces a waiting time of the processor. Therefore, system efficiency is improved.

In some embodiments, the processor 110 may include an interface. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor may include a plurality of groups of I2C buses. The processor may be separately coupled to a touch sensor, a charger, a flash, the camera, and the like by using different I2C bus interfaces. For example, the processor may be coupled to the touch sensor by using the I2C interface, so that the processor communicates with the touch sensor by using the I2C bus interface, to implement a touch function of the terminal 11.

The I2S interface may be configured to perform audio communication. In some embodiments, the processor may include a plurality of groups of I2S buses. The processor may be coupled to the audio module by using the I2S bus, to implement communication between the processor and the audio module. In some embodiments, the audio module may transmit an audio signal to the communications module by using the I2S interface, to implement a function of answering a call by using a Bluetooth headset.

The PCM interface may also be used for audio communication, and samples, quantizes, and encodes an analog signal. In some embodiments, the audio module may be coupled to the communications module by using a PCM bus interface. In some embodiments, the audio module may alternatively transmit an audio signal to the communications module by using the PCM interface, to implement a function of answering a call by using a Bluetooth headset. Both the I2S interface and the PCM interface may be configured to perform audio communication, and the two interfaces have different sampling rates.

The UART interface is a universal serial data bus, and is configured for asynchronous communication. The bus is a two-way communications bus. The bus converts to-be-transmitted data between serial communication and parallel communication. In some embodiments, the UART interface is usually configured to connect the processor and the wireless communications module 160. For example, the processor communicates with a Bluetooth module by using the UART interface, to implement a Bluetooth function. In some embodiments, the audio module may transfer an audio signal to the communications module by using the UART interface, to implement a function of playing music by using a Bluetooth headset.

The MIPI interface may be configured to connect the processor to a peripheral component such as the display or the camera. The MIPI interface includes a camera serial interface (camera serial interface, CSI), a display serial interface (display serial interface, DSI), and the like. In some embodiments, the processor communicates with the camera by using the CSI interface, to implement a photographing function of the terminal 11. The processor communicates with the display by using the DSI interface, to implement a display function of the terminal 11.

The GPIO interface may be configured by software. The GPIO interface may be configured as a control signal or a data signal. In some embodiments, the GPIO interface may be configured to connect the processor to the camera, the display, the communications module, the audio module, the sensor, and the like. The GPIO interface may also be configured as the I2C interface, the I2S interface, the UART interface, the MIPI interface, or the like.

The USB interface 130 may be a mini USB interface, a micro USB interface, a USB type-C interface, or the like. The USB interface may be configured to connect to the charger to charge the terminal 11, or may be configured to perform data transmission between the terminal 11 and a peripheral device, or may be configured to connect to a headset to play audio by using the headset. The interface may be further configured to connect to another electronic device such as an AR device.

An interface connection relationship between the modules that is shown in this embodiment of the present invention is merely an example for description, and does not constitute a limitation on a structure of the terminal 11. The terminal 11 may use an interface connection manner different from that in this embodiment of the present invention, or a combination of a plurality of interface connection manners.

The charging management module 140 is configured to receive a charging input from the charger. The charger may be a wireless charger or a wired charger. In some embodiments of wired charging, the charging management module may receive a charging input of a wired charger by using the USB interface. In some embodiments of wireless charging, the charging management module may receive a wireless charging input by using a wireless charging coil of the terminal 11. The charging management module supplies power to the terminal device by using the power management module 141 while charging the battery.

The power management module 141 is configured to connect the battery 142 and the charging management module 140 to the processor 110. The power management module receives an input of the battery and/or the charging management module, and supplies power to the processor, the internal memory, an external memory, the display, the camera, the communications module, and the like. The power management module may be further configured to monitor parameters such as a battery capacity, a battery cycle count, and a battery health status (electric leakage or impedance). In some embodiments, the power management module 141 may alternatively be disposed in the processor 110. In some embodiments, the power management module 141 and the charging management module may alternatively be disposed in a same device.

A wireless communication function of the terminal 11 may be implemented by using the antenna module 1, the antenna module 2, the radio frequency module 150, the communications module 160, the modem, the baseband processor, and the like.

The antenna 1 and the antenna 2 are configured to transmit and receive an electromagnetic wave signal. Each antenna in the terminal 11 may be configured to cover one or more communications frequency bands. Different antennas may be further multiplexed, to improve antenna utilization. For example, a cellular network antenna may be multiplexed as a diversity antenna of a wireless local area network. In some embodiments, the antenna may be used in combination with a tuning switch.

The radio frequency module 150, including a communication processing module, can provide a solution, applied to the terminal 11, to wireless communication including 2G, 3G, 4G, 5G, and the like. The radio frequency module may include at least one filter, a switch, a power amplifier, a low noise amplifier (Low Noise Amplifier, LNA), and the like. The radio frequency module receives an electromagnetic wave by using the antenna 1, perform processing such as filtering or amplification on the received electromagnetic wave, and transmit the electromagnetic wave to the modem for demodulation. The radio frequency module may further amplify a signal modulated by the modem, and convert the signal into an electromagnetic wave for radiation by using the antenna 1. In some embodiments, at least some function modules in the radio frequency module 150 may be disposed in the processor 150. In some embodiments, at least some function modules in the radio frequency module 150 may be disposed in a same device as at least some modules in the processor 110.

The modem may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker, the receiver, or the like), or displays an image or a video by using the display. In some embodiments, the modem may be an independent component. In some embodiments, the modem may be independent of the processor, and is disposed in a same device as the radio frequency module or another function module.

The communications module 160, including a communications processor module, may provide a solution, applied to the terminal 11, to wireless communication including a wireless local area network (wireless local area networks, WLAN), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The communications module 160 may be one or more components integrating at least one communications processor module. The communications module receives an electromagnetic wave by using the antenna 2, performs frequency modulation and filtering processing on an electromagnetic wave signal, and sends a processed signal to the processor. The communications module 160 may further receive a to-be-sent signal from the processor, perform frequency modulation and amplification on the signal, and convert the signal into an electromagnetic wave for radiation by using the antenna 2.

In some embodiments, the antenna 1 and the radio frequency module of the terminal 11 are coupled, and the antenna 2 and the communications module of the terminal 11 are coupled, so that the terminal 11 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The terminal 11 implements a display function by using the GPU, the display 194, the application processor, and the like. The GPU is a microprocessor for image processing, and connects the display to the application processor. The GPU is configured to: perform mathematical and geometric computation, and render an image. The processor 110 may include one or more GPUs, which execute a program instruction to generate or change display information.

The display 194 is configured to display an image, a video, and the like. The display includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the terminal 11 may include one or N displays, where N is a positive integer greater than 1.

Figure 5:
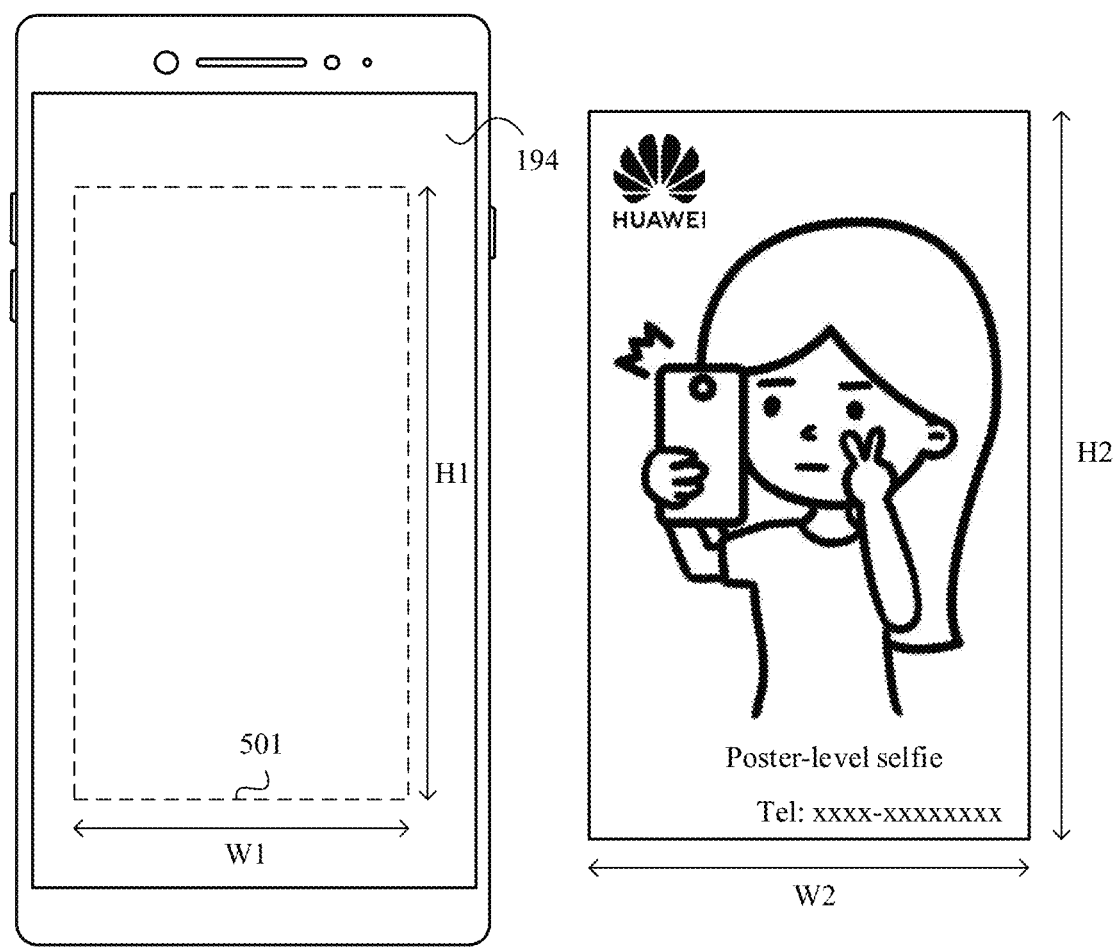
FIG. 5 is a schematic diagram of an aspect ratio of an advertisement picture and an aspect ratio of an advertisement display area according to an embodiment of this application.

In this embodiment of this application, the display 194 may be configured to display an advertisement picture. As shown in FIG. 5, the display 194 may include an advertisement display area 501. The advertisement display area 501 may be in a regular shape such as a rectangle or a circle, or an irregular shape. After obtaining a to-be-displayed advertisement picture, the terminal 11 may display the advertisement picture in the advertisement display area 501.

As shown in FIG. 5, when a shape of the advertisement display area 501 is a rectangle, an aspect ratio of the advertisement display area 501 may be a ratio of a quantity W1 of horizontal pixels to a quantity H1 of vertical pixels in the advertisement display area 501. When the advertisement display area 501 is in another shape, an aspect ratio of the advertisement display area 501 may be a ratio W1/H1 of a quantity of horizontal pixels to a quantity of vertical pixels in a maximum rectangle in the advertisement display area 501.

Usually, a shape of an advertisement picture is also a rectangle, and a size of the advertisement picture is also defined by a quantity of horizontal pixels and a quantity of vertical pixels in the advertisement picture. Therefore, still as shown in FIG. 5, an aspect ratio of the advertisement picture may be set to a ratio W2/H2 of a quantity W2 of horizontal pixels to a quantity H2 of vertical pixels in the advertisement picture.

When the aspect ratio (W2/H2) of the advertisement picture is the same as the aspect ratio (W1/H1) of the advertisement display area 501, the advertisement picture may be fully filled in the advertisement display area 501 by proportional scaling for display. Otherwise, when the aspect ratio (W2/H2) of the advertisement picture is different from the aspect ratio (W1/H1) of the advertisement display area 501, the advertisement picture cannot be filled in the entire advertisement display area 501 by proportional scaling. To enable the advertisement picture to be fully filled in the entire advertisement display area 501 when the advertisement picture is displayed, when the aspect ratio (W2/H2) of the advertisement picture is different from the aspect ratio (W1/H1) of the advertisement display area 501, the terminal 11 may crop the advertisement picture. A specific cropping method is described in detail in the following embodiments.

The terminal 11 may implement a photographing function by using the ISP, the camera 193, the video codec, the GPU, the display, the application processor, and the like.

The ISP is configured to process data fed back by the camera. For example, during photographing, a shutter is pressed, a ray of light is transmitted to a light-sensitive element of a camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image is generated for an object by using a lens and is projected onto the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 11 may include one or N cameras, where N is a positive integer greater than 1.

In addition, the digital signal processor is configured to process a digital signal. In addition to a digital image signal, the digital signal processor may further process another digital signal. For example, when the terminal 11 selects a frequency, the digital signal processor is configured to perform Fourier transform on frequency energy and the like.

The video codec is configured to compress or decompress a digital video. The terminal 11 may support one or more video codecs. In this way, the terminal 11 may play or record videos in a plurality of coding formats, for example, MPEG1, MPEG2, MPEG3 and MPEG4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the terminal 11 may be implemented by using the NPU, for example, image recognition, facial recognition, voice recognition, and text understanding.

The external memory interface 120 may be configured to connect to an external memory card, for example, a micro SD card, to extend a storage capability of the terminal 11. The external memory card communicates with the processor by using the external memory interface, to implement a data storage function. For example, a file such as music and a video is stored in the external memory card.

The internal memory 121 may be configured to store computer executable program code, and the executable program code includes an instruction. The processor 110 runs the instruction stored in the internal memory 121, to execute various function applications and data processing of the terminal 11. The memory 121 may include a program storage area and a data storage area. The program storage area may store an operating system, an application program required by at least one function (for example, a voice playing function or an image playing function), and the like. The data storage area may store data (for example, audio data and a phone book) and the like created in a use process of the terminal 11. In addition, the memory 121 may include a high-speed random access memory, and may further include a non-volatile memory such as at least one magnetic disk storage device, a flash memory, another volatile solid-state storage device, or a universal flash storage (universal flash storage, UFS).

The terminal 11 can implement an audio function such as music playback or recording by using the audio module 170, the speaker 170A, the receiver 170B, the microphone 170C, the headset jack 170D, the application processor, and the like.

The audio module is configured to convert digital audio information into an analog audio signal output, and is also configured to convert an analog audio input into a digital audio signal. The audio module may be further configured to code and decode an audio signal. In some embodiments, the audio module may be disposed in the processor 110, or some function modules in the audio module are disposed in the processor 110.

The speaker 170A, also referred to as a "horn", is configured to convert an audio electrical signal into a sound signal. The terminal 11 may be used to listen to music or answer a call in a hands-free mode over the speaker.

The receiver 170B, also referred to as an "earpiece", is configured to convert an audio electrical signal into a sound signal. When a call is answered or voice information is listened to by using the terminal 11, the receiver may be put close to a human ear to listen to a voice.

The microphone 170C, also referred to as a "mike" or a "microphone", is configured to convert a sound signal into an electrical signal. When making a call or sending voice information, a user may make a sound near the microphone through the mouth of the user, to input a sound signal to the microphone. At least one microphone may be disposed in the terminal 11. In some embodiments, two microphones may be disposed in the terminal 11, to collect a sound signal and implement a noise reduction function. In some embodiments, three, four, or more microphones may alternatively be disposed in the terminal 11, to collect a sound signal, implement noise reduction, and recognize a sound source, so as to implement a directional recording function and the like.

The headset jack 170D is configured to connect to a wired headset. The headset jack may be a USB interface, or may be a 3.5 mm open mobile terminal platform (open mobile terminal platform, OMTP) standard interface or cellular telecommunications industry association of the USA (cellular telecommunications industry association of the USA, CTIA) standard interface.

The sensor module 180 of the terminal 11 may specifically include a pressure sensor, a gyro sensor, a barometric pressure sensor, a magnetic sensor (for example, a Hall effect sensor), an acceleration sensor, a distance sensor, an optical proximity sensor, an ambient optical sensor, a fingerprint sensor, a temperature sensor, a bone conduction sensor, a touch sensor, and the like. The touch sensor is also referred to as a "touch panel". The touch sensor may be disposed on the display. The touch sensor is configured to detect a touch operation performed on or near the touch sensor. The touch sensor may transfer the detected touch operation to the application processor to determine a type of a touch event, and provide a corresponding visual output by using the display.

The terminal 11 may further include components such as a USB interface 130, a charging management module 140, a power management module 141, a battery 142, and a SIM card interface 195. This is not limited in the embodiments of this application.

For ease of understanding, the following specifically describes, with reference to the accompanying drawings, a method for displaying an advertisement picture provided in the embodiments of this application.

Figure 6:
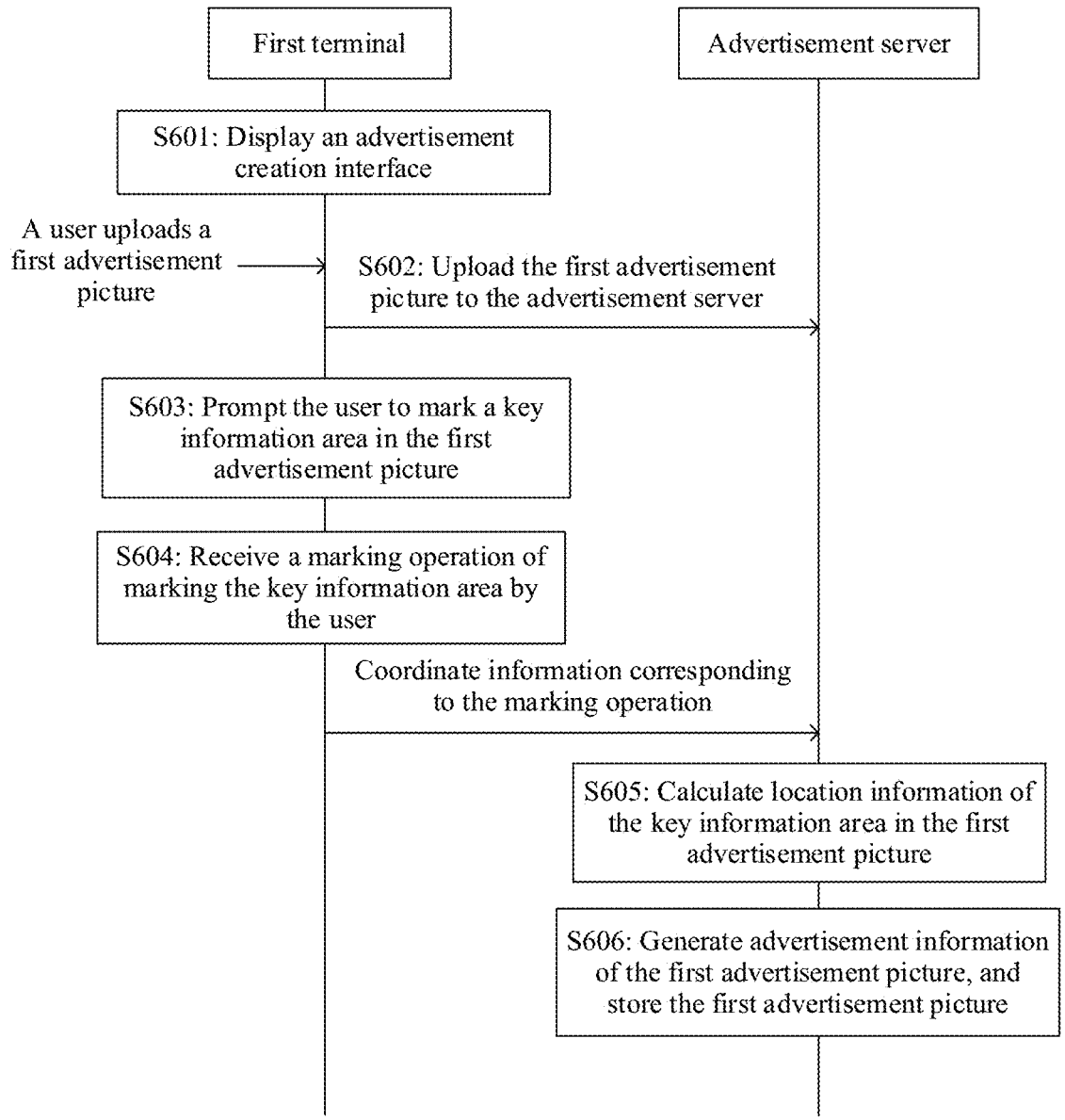
FIG. 6 is a schematic interaction diagram of a method for uploading an advertisement picture according to an embodiment of this application.

FIG. 6 is a schematic interaction diagram of a method for uploading an advertisement picture according to an embodiment of this application. The method includes the following steps.

S601: A first terminal displays an advertisement creation interface, where an upload area for uploading an advertisement picture is set in the advertisement creation interface.

Figure 7:
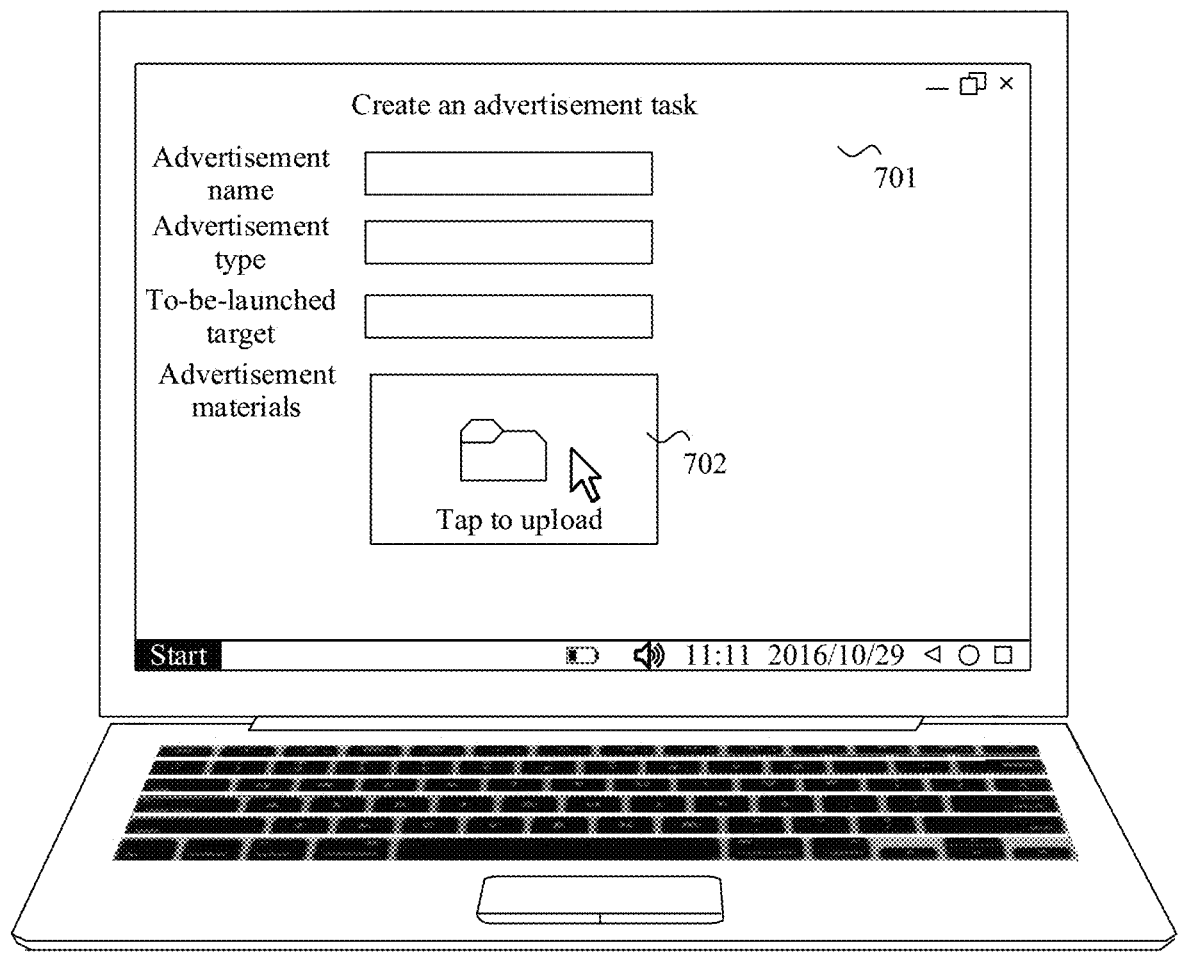
FIG. 7 is a schematic scenario diagram 1 of a method for uploading an advertisement picture according to an embodiment of this application.

When an advertiser needs to launch an advertisement, the first terminal may be used to log in to the advertisement creation interface for creating a new advertisement. For example, the advertiser may enter, in a browser of the first terminal, a network address associated with an advertisement server, to log in to the advertisement creation interface. Alternatively, the advertiser may use a corresponding app to log in to the advertisement creation interface. As shown in FIG. 7, in an advertisement creation interface 701, the advertiser may upload an advertisement material of the new advertisement to the advertisement server. For example, as shown in FIG. 7, the advertisement creation interface 701 may include an upload area 702 for uploading an advertisement picture. The advertiser may upload one or more pictures stored in the first terminal to the upload area 702 as advertisement pictures.

In addition, in the advertisement creation interface 701, the advertiser may further upload, to the advertisement server, information such as an advertisement name and an advertisement type of the to-be-launched advertisement. This is not limited in the embodiments of this application.

S602: The first terminal receives an upload operation of uploading a first advertisement picture in the upload area by a user, and uploads the first advertisement picture to the advertisement server.

Figure 8:
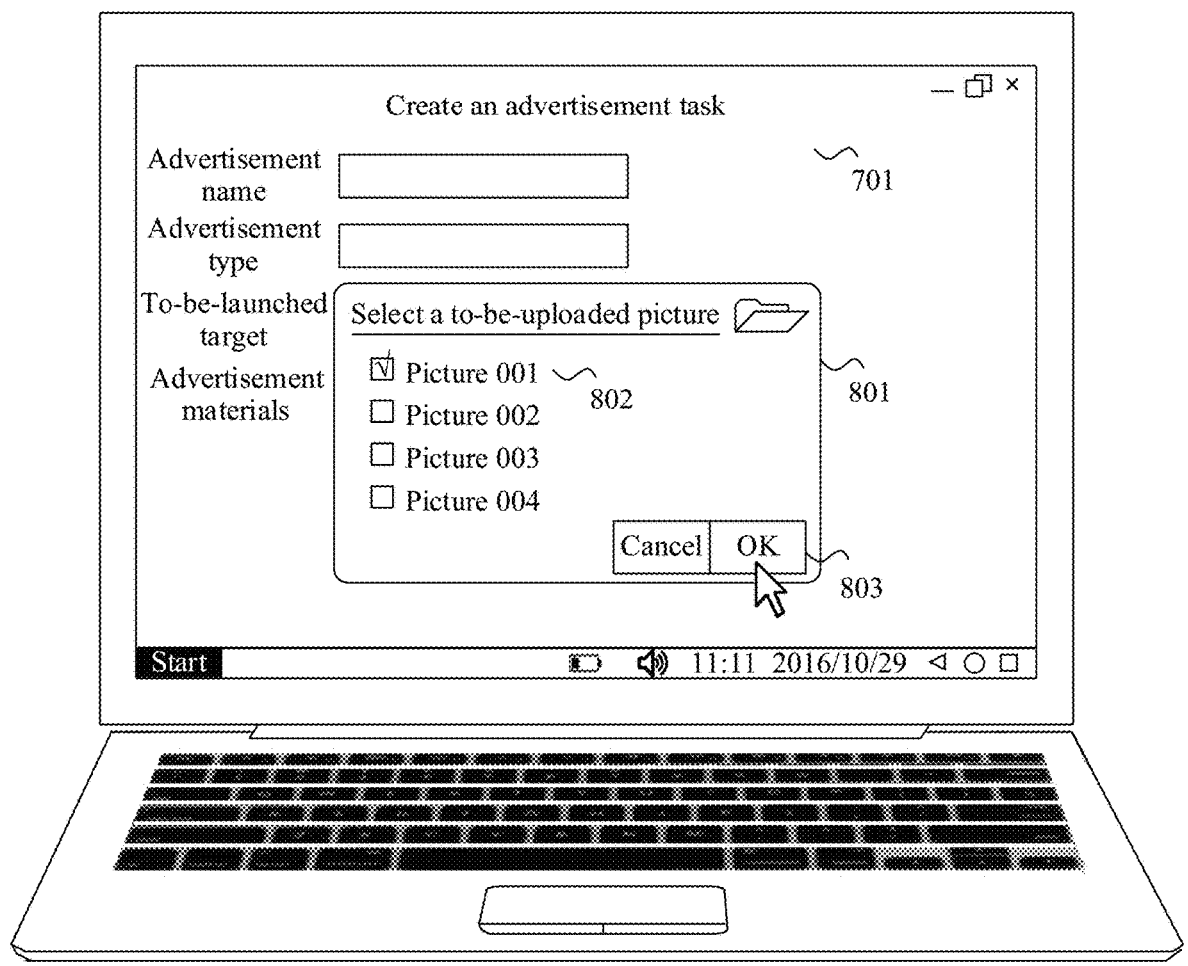
FIG. 8 is a schematic scenario diagram 2 of a method for uploading an advertisement picture according to an embodiment of this application.

After logging in to the advertisement creation interface 701 by using the first terminal, the advertiser may upload, in the upload area 702 in the advertisement creation interface 701, an advertisement picture (for example, the first advertisement picture) that the advertiser wants to launch. The first terminal may upload the first advertisement picture to the advertisement server in response to an upload operation of the advertiser. For example, when the first terminal detects that the user (that is, the advertiser) taps an upload button 703 in the upload area 702, as shown in FIG. 8, the first terminal may display a dialog box 801, and the dialog box 801 may include all files in the first terminal. The advertiser may select, from the dialog box 801, a first advertisement picture 802 that needs to be uploaded to the advertisement server. After detecting that the user taps a completion button 803 in the dialog box 801, the first terminal uploads the first advertisement picture 802 selected by the user to the advertisement server.

Figure 9:
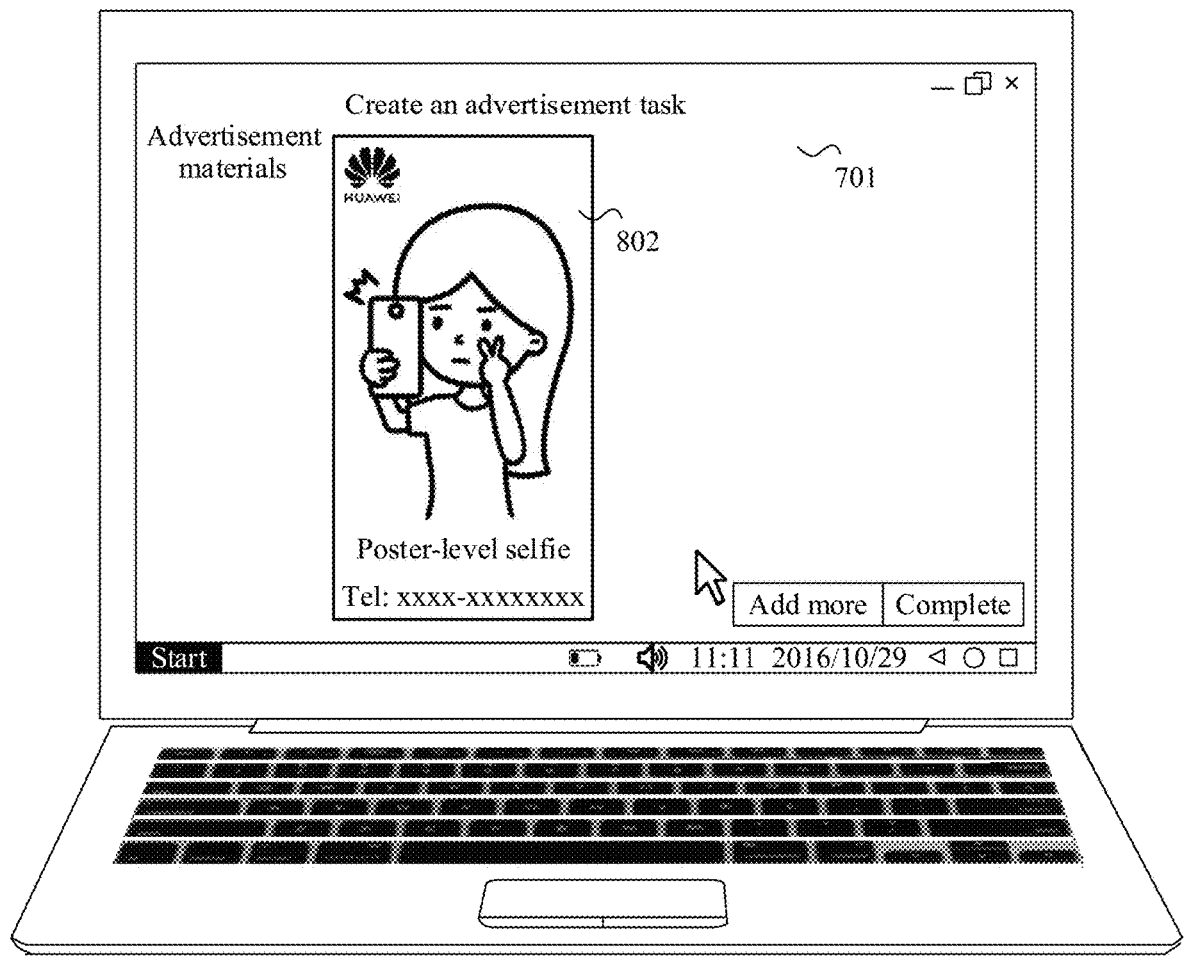
FIG. 9 is a schematic scenario diagram 3 of a method for uploading an advertisement picture according to an embodiment of this application.

After the first terminal uploads the first advertisement picture 802 to the advertisement server, as shown in FIG. 9, the first terminal may further display the uploaded first advertisement picture 802 in the advertisement creation interface 701. Therefore, it is convenient for the advertiser to view an advertisement effect of the first advertisement picture 802 that is subsequently launched. In addition, the advertiser may upload one or more advertisement pictures according to the foregoing method. This is not limited in the embodiments of this application.

S603: The first terminal prompts the user to mark at least one key information area in the uploaded first advertisement picture.

After the advertiser uploads the first advertisement picture 802 in the advertisement creation interface 701, the first terminal may prompt the user to mark, in the uploaded first advertisement picture 802, one or more key information areas including key information. The key information area marked by the advertiser may be used as a basis for cropping the first advertisement picture 802 when the another terminal subsequently displays the first advertisement picture 802.

Figure 10A:
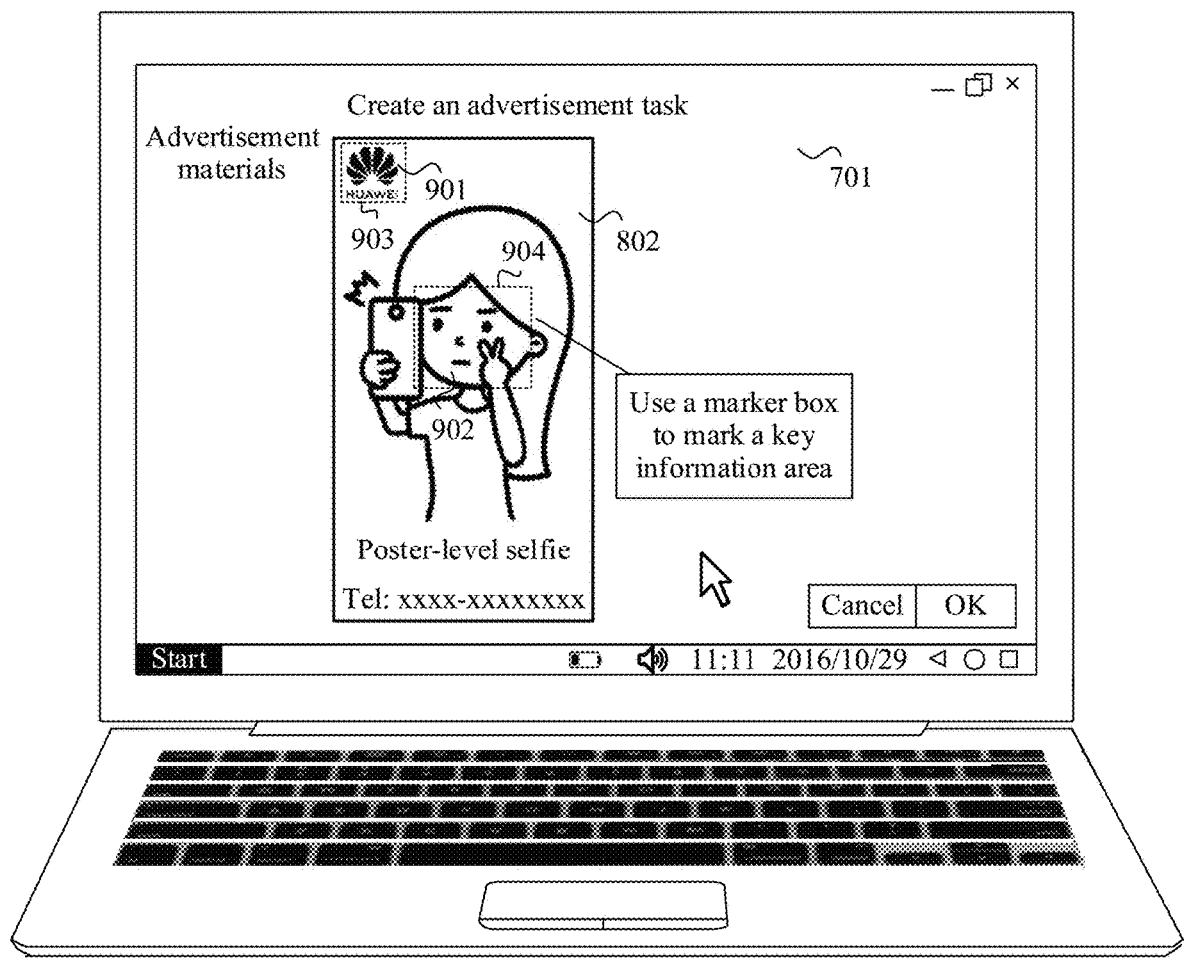
FIG. 10A is a schematic scenario diagram 4 of a method for uploading an advertisement picture according to an embodiment of this application.

For example, after the advertiser uploads the first advertisement picture 802 in the advertisement creation interface 701, the first terminal may perform image recognition on the first advertisement picture 802 by using a specific image recognition algorithm, to identify the key information in the first advertisement picture 802. The key information may be a phone number, a trademark, a commodity image, a text, a face, or the like. As shown in FIG. 9, the first terminal identifies that the key information of the first advertisement picture 802 includes a trademark 901 and a face 902. Further, the first terminal may circle the trademark 901 by using a first mark box 903, and circle the face 902 by using a second mark box 904. Still as shown in FIG. 10A, sizes and locations of the first mark box 903 and the second mark box 904 are adjustable. The advertiser can mark a key information area in the first advertisement picture 802 by adjusting the sizes and locations of the first mark box 903 and the second mark box 904 in the advertisement creation interface 701. In this case, the key information area is an area in which the first mark box 903 and the second mark box 904 are located.

Figure 10B:
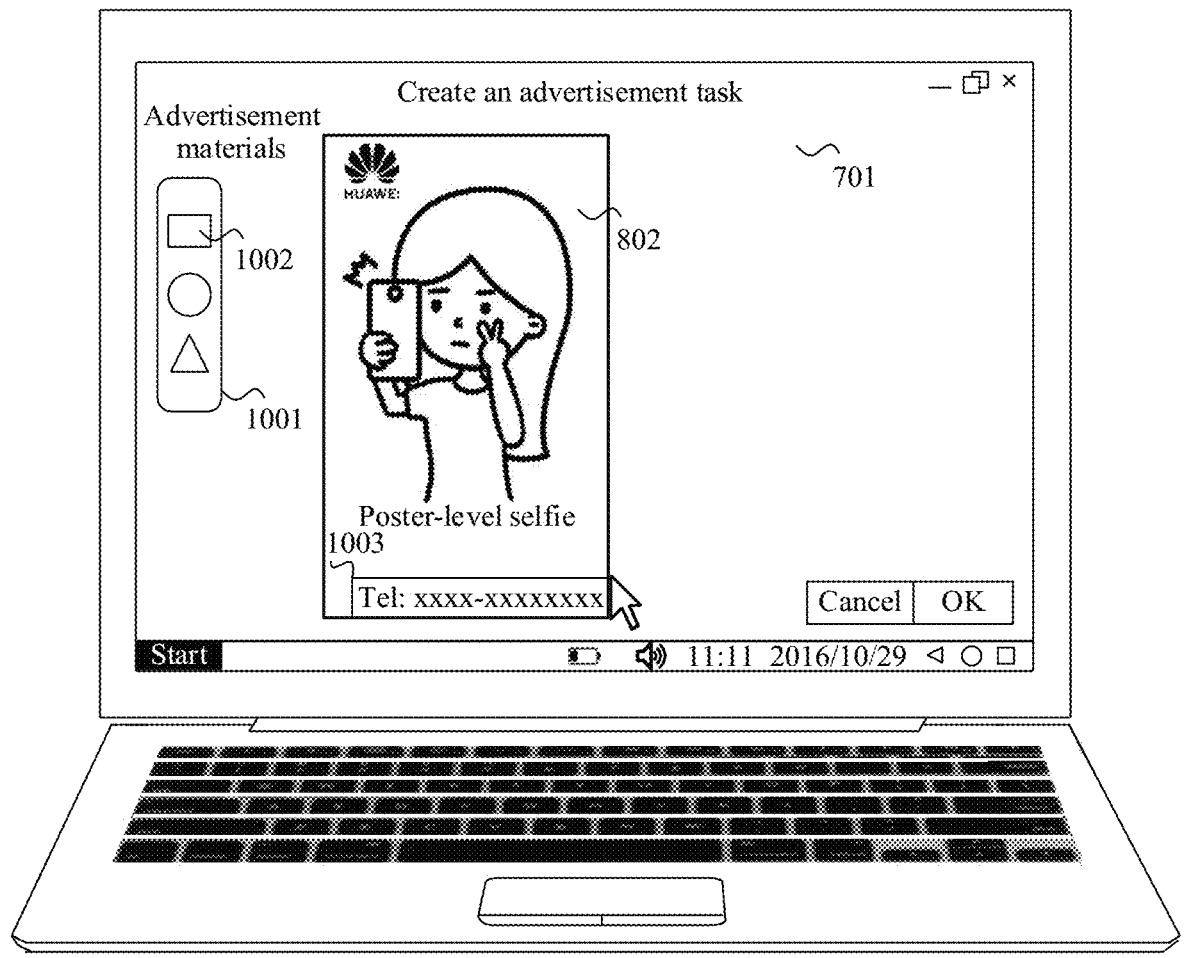
FIG. 10B is a schematic scenario diagram 5 of a method for uploading an advertisement picture according to an embodiment of this application.

For another example, as shown in FIG. 10B, the first terminal may set a toolbar 1001 in the advertisement creation interface 701, and the toolbar 1001 includes tool buttons 1002 representing different shapes. After detecting that the user taps one tool button 1002, the first terminal may display, in the first advertisement picture 802 based on a shape represented by the tool button 1002, a mark box 1003 whose size and location are adjustable. Therefore, the advertiser can mark a key information area in the first advertisement picture 802 by adjusting the size and the location of the mark box 1003 in the first advertisement picture 802. In this case, the key information area is an area in which the mark box 1003 in the first advertisement picture 802 is located.

Certainly, in addition to prompting, by using the mark box or the tool button, the advertiser to mark the key information area in the first advertisement picture, the first terminal may further prompt, in a form of a text, an animation, a voice, or the like, the user to mark the key information area in the first advertisement picture. In addition, a shape of the mark box may be a rectangle, or may be any other shape such as a triangle or a circle. This is not limited in the embodiments of this application.

S604: The first terminal receives a marking operation of marking the key information area in the first advertisement picture by the user.

S605: The advertisement server calculates location information of the key information area in the first advertisement picture in response to the marking operation.

In step S604 to step S605, the advertiser may mark one or more key information areas in the first advertisement picture 802 based on a prompt (for example, the tool button 1001) in the advertisement creation interface 701. After detecting the marking operation of the advertiser, the first terminal may send coordinate information corresponding to the marking operation to the advertisement server. For example, if the advertiser marks a rectangle in the first advertisement picture 802 by using the mark box, the first terminal may send coordinates of a vertex in a top left corner of the rectangle and coordinates of a vertex in a lower right corner of the rectangle to the server. After receiving coordinate information corresponding to the marking operation, the advertisement server may calculate a specific location of the key information area marked by the advertiser in the first advertisement picture 802, that is, location information of the key information area.

For example, still as shown in FIG. 10A, it is assumed that the key information area marked by the advertiser in the first advertisement picture 802 is an area in which the first mark box 903 and the second mark box 904 are located. If it is detected that the advertiser taps "OK" button 905 in the advertisement creation interface 701, it indicates that the area in which the first mark box 903 and the second mark box 904 are located is a key information area confirmed by the advertiser. In this case, the first terminal may send information such as sizes and locations of the first mark box 903 and the second mark box 904 in the advertisement creation interface 701 to the advertisement server. In addition, when uploading the first advertisement picture 802, the first terminal may also send information such as a size and a location of the first advertisement picture 802 in the advertisement creation interface 701 to the advertisement server.

Figure 11:
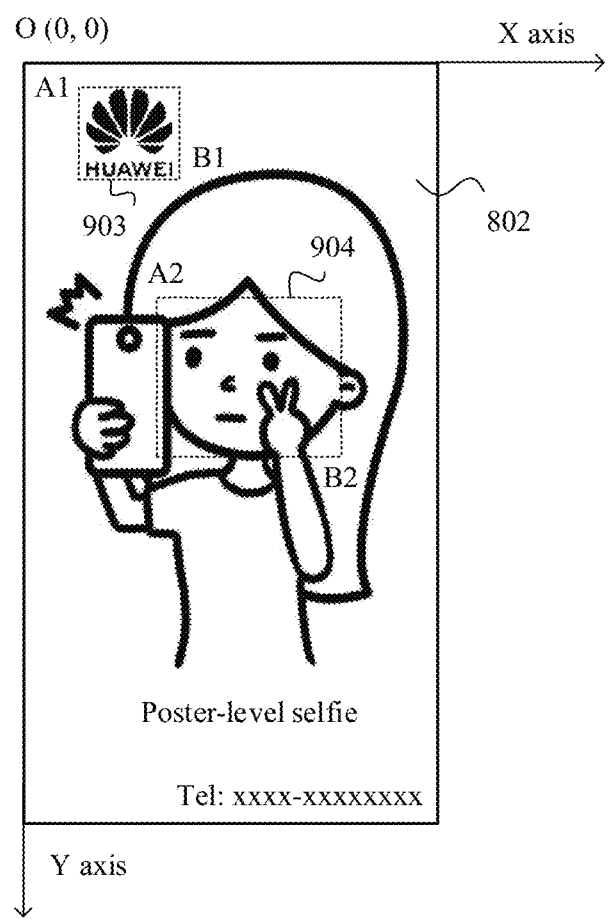
FIG. 11 is a schematic scenario diagram 6 of a method for uploading an advertisement picture according to an embodiment of this application.

In this way, the advertisement server may calculate, by converting a coordinate system, first coordinate information of the first mark box 903 in the first advertisement picture 802 and second coordinate information of the second mark box 904 in the first advertisement picture 802. For example, as shown in FIG. 11, a size of the first advertisement picture 802 is 540×1080. The advertisement server may use a vertex O in a top left corner of the first advertisement picture 802 as an origin, and learn, through calculation, that a vertex A1 in a top left corner of the first mark box 903 is (100, 50), and a vertex B1 in a lower right corner of the first mark box 903 is (200, 200). The coordinates of the vertex A1 and the vertex B1 are the first coordinate information of the first mark box 903 in the first advertisement picture 802. Similarly, the vertex O in the top left corner of the first advertisement picture 802 is still used as an origin. The advertisement server may learn, through calculation, that a vertex A2 in a top left corner of the second mark box 904 is (180, 260), and a vertex B2 in a lower right corner of the second mark box 904 is (420, 580). The coordinates of the vertex A2 and the vertex B2 are the second coordinate information of the second mark box 904 in the first advertisement picture 802.

In addition, when marking the key information area in the first advertisement picture 802, the advertiser may further set a priority of the key information area. When a priority of the key information area is higher, it indicates that information in the key information area is more important and the advertiser less wants the information to be cut out.

Figure 12:
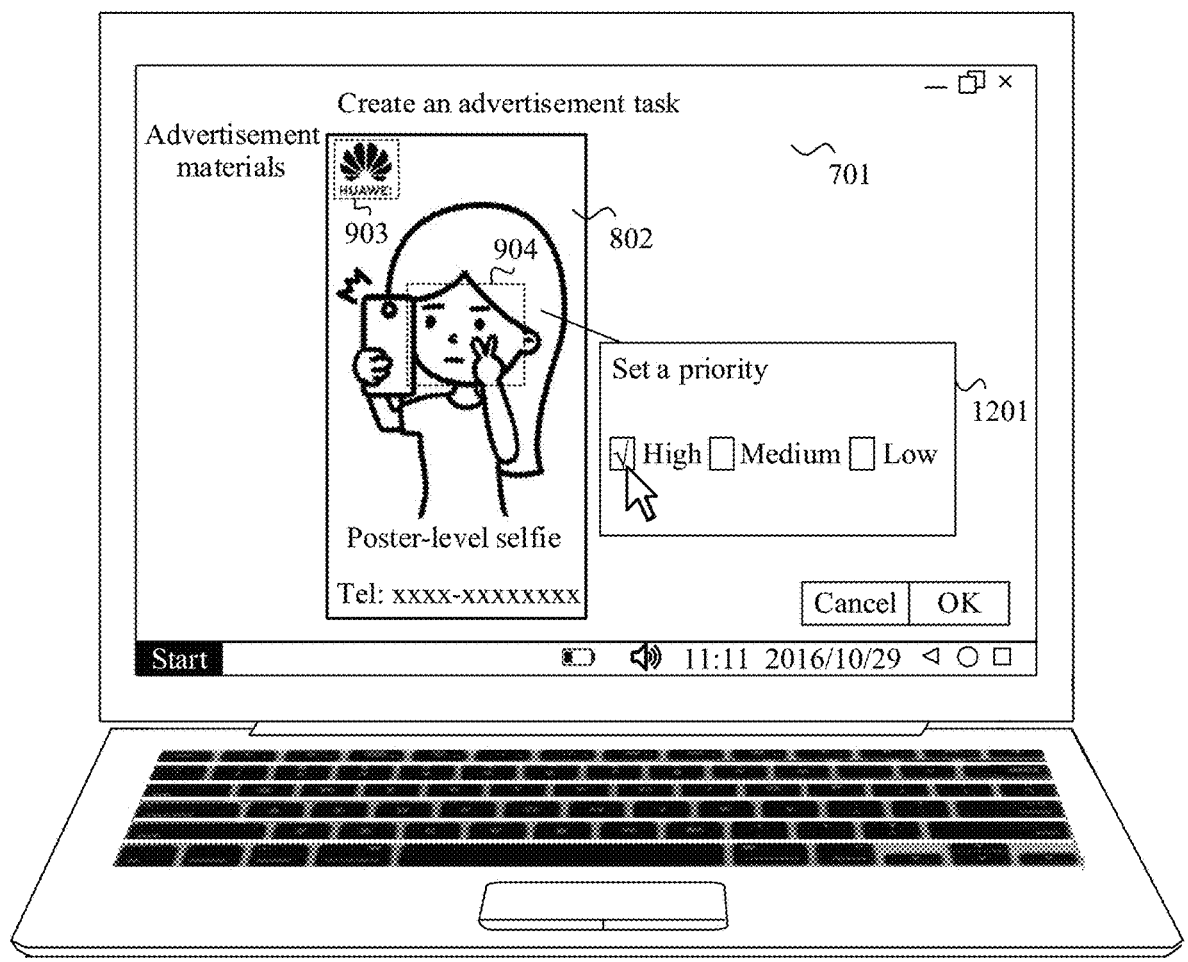
FIG. 12 is a schematic scenario diagram 7 of a method for uploading an advertisement picture according to an embodiment of this application.

For example, as shown in FIG. 12, a priority menu 1201 may be set in the advertisement creation interface 701. When displaying the first mark box 903 (or the second mark box 904) in the advertisement creation interface 701, the first terminal may further display a priority of the first mark box 903 (or the second mark box 904) in the priority menu 1201. The advertiser may set or change the priority of the first mark box 903 (or the second mark box 904) in the priority menu 1201. For example, the priority of (or the second tag box 904) may be set to low, medium, or high. Further, the first terminal may send the priority set by the advertiser for the first mark box 903 to the advertisement server.

Figure 13:
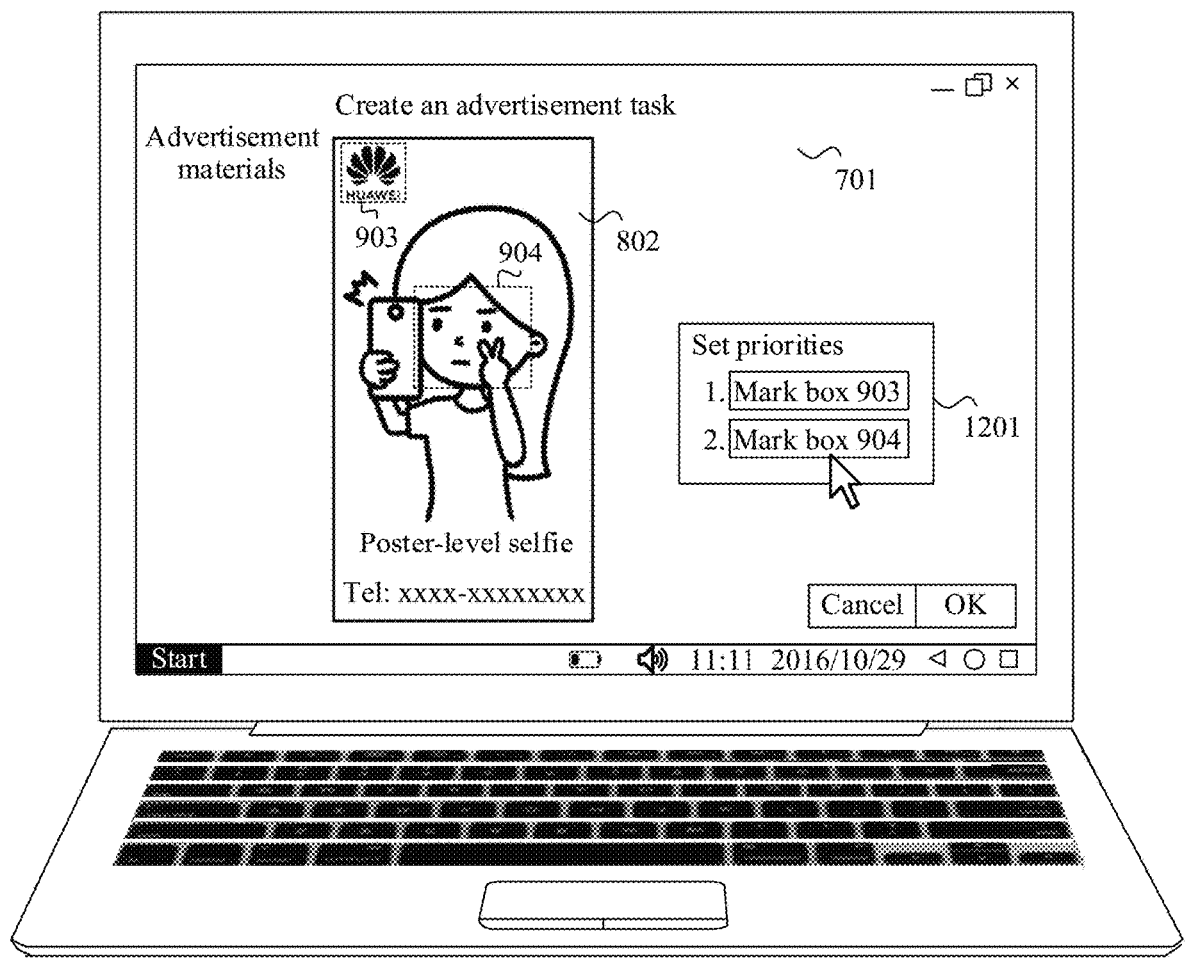
FIG. 13 is a schematic scenario diagram 8 of a method for uploading an advertisement picture according to an embodiment of this application.

Alternatively, as shown in FIG. 13, when the advertiser marks a plurality of key information areas (for example, the first mark box 903 and the second mark box 904) in the first advertisement picture 802, the first terminal may further display a priority sequence between the key information areas in the priority menu 1201. The advertiser may manually adjust the priority sequence between the key information areas in the priority menu 1201. Similarly, the first terminal may send, to the advertisement server, the priority sequence set by the advertiser for the key information areas.

Certainly, the advertisement server may alternatively automatically set a priority of the key information area in the first advertisement picture 802. For example, a key information area including a face may be set as a key information area with a highest priority, and a key information area including a phone number may be set as a key information area with a lowest priority. This is not limited in the embodiments of this application.

S606: The advertisement server generates advertisement information of the first advertisement picture, and stores the first advertisement picture in an advertisement resource pool.

Figure 14:
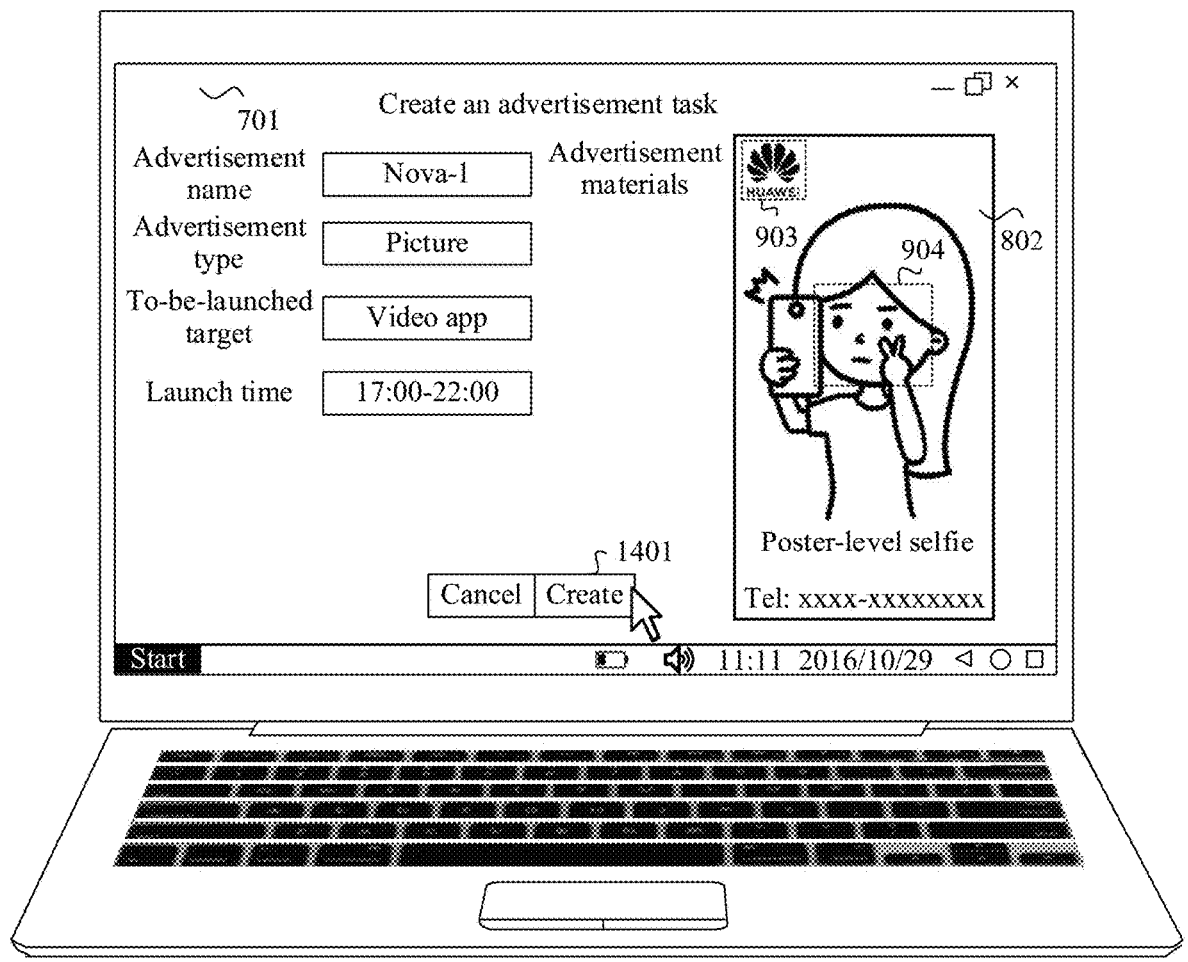
FIG. 14 is a schematic scenario diagram 9 of a method for uploading an advertisement picture according to an embodiment of this application.

As shown in FIG. 14, after filling in various pieces of information, in the advertisement creation interface 701, about the first advertisement picture 802 that needs to be launched, the advertiser may tap a button 1401 for creating an advertisement to submit an advertisement task. After detecting that the advertiser taps the button 1401, the first terminal may send an advertisement creation instruction to the advertisement server. In response to the advertisement creation instruction, the advertisement server may store the uploaded first advertisement picture 802 in the advertisement resource pool as an advertisement material. In addition, the advertisement server may further generate advertisement information of the first advertisement picture based on the various pieces of information filled in the advertisement creation interface 701 by the advertiser. The advertisement information may include information such as an identifier of the first advertisement picture 802, a type of the first advertisement picture 802, and a storage address of the first advertisement picture 802 in the advertisement resource pool.

In addition, in this embodiment of this application, the advertisement information generated by the advertisement server for the first advertisement picture 802 further includes the location information of the key information area that is calculated in step S605. Further, the advertisement information of the first advertisement picture 802 further includes priority information of the key information area.

For example, the advertisement server may store the location information and the priority information of the key information area in the first advertisement picture 802 in the following format:

creativeId (ID of the first advertisement picture 802): 201803281516420100232;

keyAreaId (ID of the key information area): 84320943;

topLeftX (horizontal coordinate of the vertex in the top left corner of the key information area): 100;

topLeftY (vertical coordinate of the vertex in the top left corner of the key information area): 50;

lowerRightX (horizontal coordinate of the vertex in the lower right corner of the key information area): 200;

lowerRightY (vertical coordinate of the vertex in the lower right corner of the key information area): 200; and priority (priority of the key information area): 0 (highest).

In other words, the advertisement server sets the keyAreaId field, the topLeftX field, the topLeftY field, the lowerRightX field, the lowerRightY field, and the priority field in the advertisement information of the first advertisement picture 802. The keyAreaId field is used to store an identifier of the key information area. The topLeftX field, the topLeftY field, the lowerRightX field, and the lowerRightY field are used to store the location information of the key information area. The priority field is used to store the priority information of the key information area. The key information area in this example is a rectangle. If the key information area is in another shape, another field may be used for storage. This is not limited in the embodiments of the present invention.

In some other embodiments of this application, when storing the first advertisement picture 802, the advertisement server may also store, in the advertisement resource pool, the location information and the priority information of the key information area in the first advertisement picture 802. In this way, when subsequently downloading the first advertisement picture 802 from the advertisement resource pool, another terminal may also download the location information and the priority information of the key information area in the first advertisement picture 802.

Alternatively, the advertisement server may specially store, in a storage space, the location information and the priority information of the key information area in the first advertisement picture 802. For example, a server A may be preset, and the server A is specially configured to store location information and priority information of a key information area in each advertisement picture uploaded by an advertiser. In addition, the advertisement server may further maintain the first advertisement picture 802, the advertisement information of the first advertisement picture 802, and a correspondence between the location information and the priority information of the key information area in the first advertisement picture 802. In this way, when a terminal requests the advertisement server to display the first advertisement picture 802, the advertisement server may send, to the terminal based on the correspondence, corresponding location information and corresponding priority information of the key information area that are stored in the server A.

It should be noted that, in the foregoing embodiment, an example in which the advertiser uploads the first advertisement picture 802 is used for description. It may be understood that, when any advertiser uploads any advertisement picture, the advertisement server may determine a key information area in the advertisement picture according to the method described in steps S601 to S606, and generates advertisement information of the advertisement picture.

Figure 15:
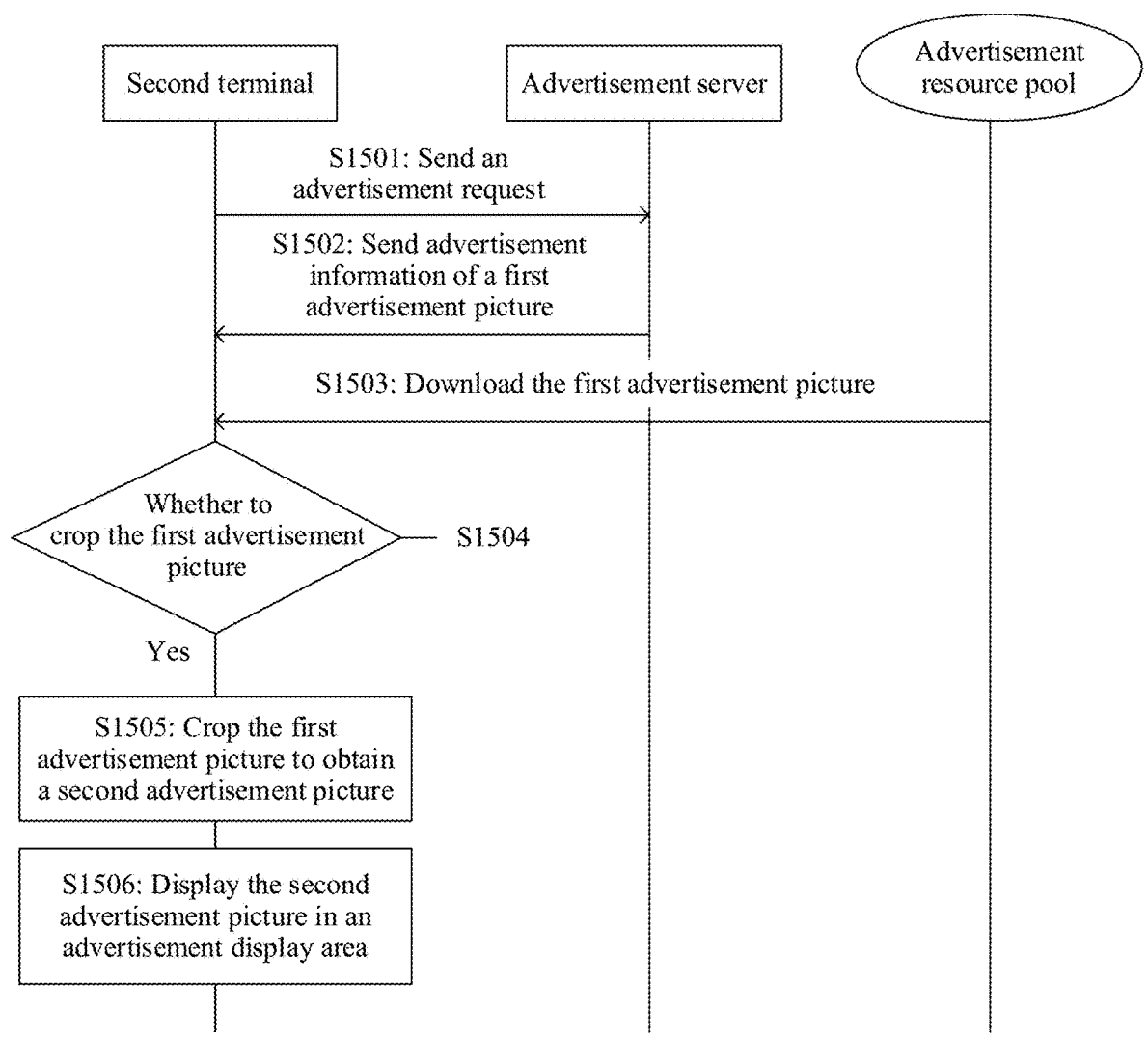
FIG. 15 is a schematic interaction diagram of a method for displaying an advertisement picture according to an embodiment of this application.

In some embodiments of this application, FIG. 15 is a schematic interaction diagram of a method for displaying an advertisement picture according to an embodiment of this application. The method includes the following steps.

S1501: A second terminal sends an advertisement request to an advertisement server.

Figure 16:
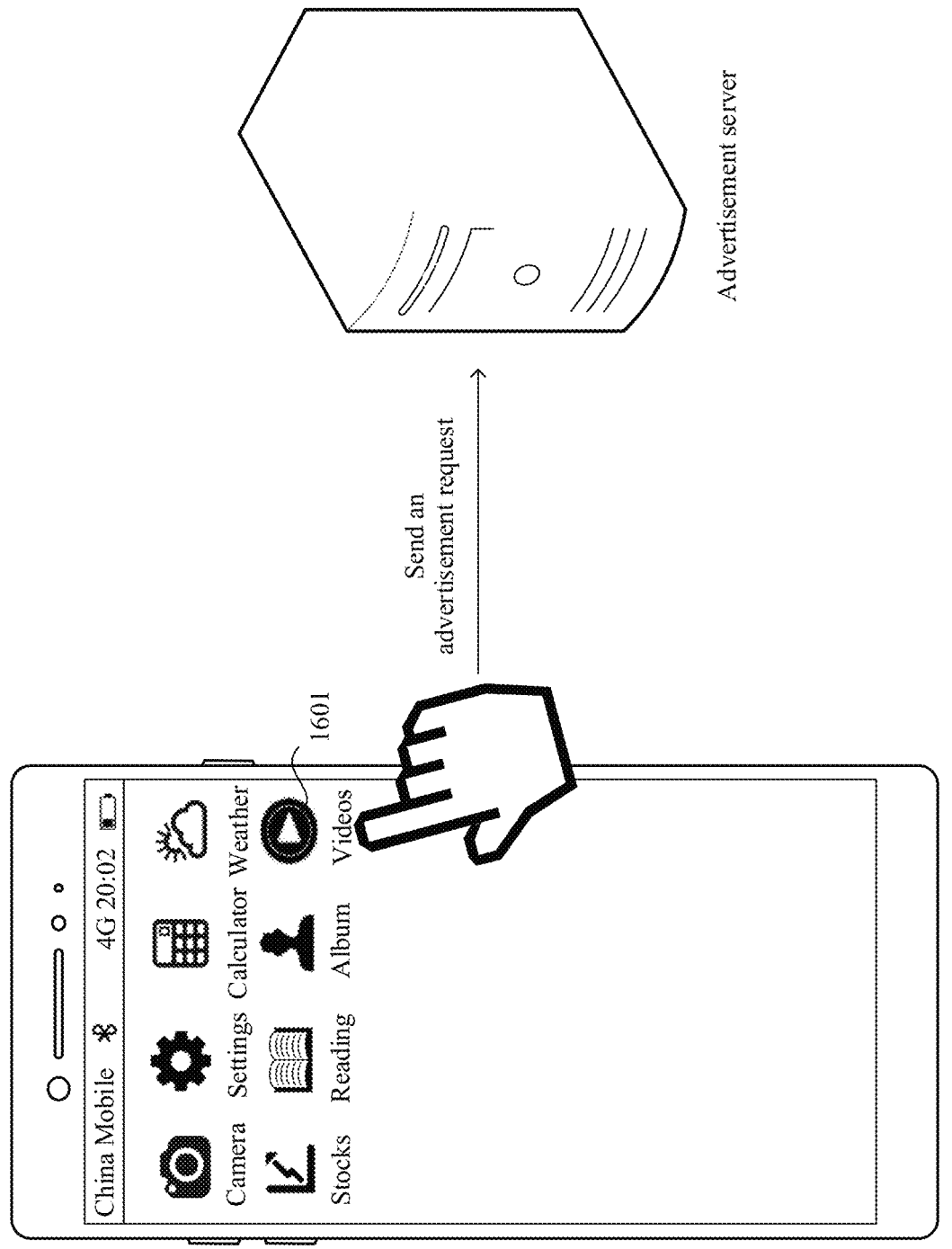
FIG. 16 is a schematic scenario diagram 1 of a method for displaying an advertisement picture according to an embodiment of this application.

When a terminal (for example, the second terminal) detects that a user enables an app or enters a specified interface of an app, it may be considered that the second terminal has an advertisement display requirement in this case. As shown in FIG. 16, when it is detected that the user taps an icon 1601 of a player application on a desktop, the second terminal may invoke an application programming interface (API) of the player application to enable the player application, and at the same time, the second terminal may further send the advertisement request to the advertisement server.

In step S1501, the second terminal may send the advertisement request to the advertisement server based on a network protocol such as the hypertext transfer protocol (HTTP), the hypertext transfer protocol secure (HTTPS), the file transfer protocol (FTP), or the secure file transfer protocol (SFTP).

For example, when the user enables a player application installed in the second terminal, the player application may be triggered to invoke an advertisement software development kit (software development kit, SDK), and send the advertisement request to the advertisement server in a JavaScript object notation (JavaScript Object Notation, JSON) message format in HTTP.

The advertisement request may carry parameters such as an application package name (pkgname) of a current app, an advertisement slot ID (slotid), and a requested advertisement type (adtype), so that the advertisement server determines advertisement information matching the advertisement request.

The advertisement slot ID may be used to indicate an identifier of an advertisement display area during this advertising. The advertisement types may include a banner (banner) advertisement, a splash (splash) advertisement, a full screen advertisement (full screen ads), a native (native) advertisement, and the like.

Further, the advertisement request may further include an advertisement slot width (width) and an advertisement slot height (height), where the advertisement slot width and the advertisement slot height are usually less than a width and a height of a screen of the second terminal.

In addition, the advertisement request may further include device information of the second terminal, for example, a device type (devicetype) of the second terminal, a version (version) number of an operating system in the second terminal, a device maker (maker) to which the second terminal belongs, a device model (model) of the second terminal, an operating system language (language) used by the second terminal, an international mobile equipment identity (IMEI), a mobile equipment identity (MEID), an electronic serial number (ESN), or an Android ID (a unique identifier of an Android device) of the second terminal, a media access control (MAC) layer address of the second terminal, and the like.

For example, the advertisement request sent by the second terminal to the advertisement server is as follows:
{
"slotid": "024366ce8e1e1033ba6080fb06ade1 de", //Advertisement slot ID
"width": 1920, //The advertisement slot width is 1920
"height": 1080, //The advertisement slot height is 1080
"adtype": 1, //The advertisement type is a full-screen advertisement
"pkgname": "com.huawei.music", //The application package name is com.huawei.music
"devicetype": 4, //The device type is a mobile phone
"version": "4.4.2", //The version number of the operating system is 4.4.2
"maker": "HUAWEI", //The device maker is HUAWEI
"model": "HUAWEI MT2-C00", //The device model is HUAWEI MT2-C00
"language": "zh", //The operating system language is zh (Chinese)
"imei": "862758022496721", // The IMEI is 862758022496721
"androidid": "8f3d82a6a2b35df3", // The Android ID is 8f3d82a6a2b35df3
"mac": "00:01:6C:06:A6:29", //The MAC address is 00:01:6C:06:A6:29
}

S1502: The advertisement server sends advertisement information of a first advertisement picture to the second terminal in response to the advertisement request, where the advertisement information includes a download address of the first advertisement picture and location information of the key information area.

After receiving the advertisement request sent by the second terminal, the advertisement server may compare each parameter carried in the advertisement request with stored advertisement information one by one. Further, advertisement information satisfying one or more parameters in the advertisement request is used as advertisement information of an advertisement to be played this time.

For example, if an advertisement of a picture type is requested in the advertisement request, the advertisement server may select a piece from advertisement information of the picture type as advertisement information to be sent to the second terminal.

For another example, if the advertisement request specifies that an advertisement slot width is 1080 and an advertisement slot height is 1920, that is, an aspect ratio of an advertisement display area currently used by the second terminal to display an advertisement is 9:16, the advertisement server may preferentially use an advertisement picture whose aspect ratio is 9:16 as the advertisement picture that needs to be displayed by the second terminal this time. Certainly, the advertisement server may alternatively use an advertisement picture whose aspect ratio is not 9:16 as the advertisement picture that needs to be displayed by the second terminal this time.

After the advertisement server determines, in response to the advertisement request, the advertisement picture (for example, the first advertisement picture 802) that needs to be displayed by the second terminal this time in step S702, the advertisement server may send the advertisement information generated for the first advertisement picture 802 in step S606 to the second terminal.

The advertisement information of the first advertisement picture 802 includes the download address of the first advertisement picture 802 and the location information of the key information area determined by the advertisement server in step S605.

Similar to the message format of the advertisement request, the advertisement information of the first advertisement picture 802 sent by the advertisement server may also be expressed by using a JSON message format. For example, the first advertisement picture 802 includes the two key information areas in which the first mark box 903 and the second mark box 904 are located. The advertisement information of the first advertisement picture 802 may include the following content:

"creativeId": "201803281516420100232", —ID of the first advertisement picture 802

"keyArea": —Definition of the key information area, and there may be a plurality of key information areas
[
{
"keyAreaId": "84320943", —ID defined by a key information area 1
"topLeftX": 100, —Horizontal coordinate of a vertex in a top left corner of the key information area 1
"topLeftY": 50, —Vertical coordinate of the vertex in the top left corner of the key information area 1
"lowerRightX": 200, —Horizontal coordinate of a vertex in a lower right corner of the key information area 1
"lowerRightY": 200, —Vertical coordinate of the vertex in the lower right corner of the key information area 1
"priority": 0, —Priority of the key information area 1
},
{
"keyAreaId": "35912067", —ID defined by a key information area 2
"topLeftX": 180, —Horizontal coordinate of a vertex in a top left corner of the key information area 2
"topLeftY": 260, —Vertical coordinate of the vertex in the top left corner of the key information area 2
"lowerRightX": 420, —Horizontal coordinate of a vertex in a lower right corner of the key information area 2
"lowerRightY": 580, —Vertical coordinate of the vertex in the lower right corner of the key information area 2
"priority": 1, —Priority of the key information area 2
}
"html": "http://cs.op.hicloud.com/contserver/data/345ETF89DFFw23KL.jpg", //Download address of the first advertisement picture 802
]

In addition, the advertisement information of the first advertisement picture 802 may further include parameters such as a size of the first advertisement picture 802 and an interaction type (interactiontype) of the first advertisement picture 802. This is not limited in the embodiments of this application. Interaction types of the first advertisement picture 802 may include interaction types such as no response after the user taps the first advertisement picture 802, opening a related web page after the user taps the first advertisement picture 802, downloading an application after the user taps the first advertisement picture 802, and entering an application after the user taps the first advertisement picture 802.

S1503: The second terminal downloads the first advertisement picture from an advertisement resource pool based on the download address of the first advertisement picture.

After the second terminal receives, in step S1503, the advertisement information that is of the first advertisement picture 802 and that is sent by the advertisement server, the second terminal may download, based on the download address in the advertisement information, the first advertisement picture 802 stored in the advertisement resource pool to the second terminal.

S1504: The second terminal determines, based on the size of the first advertisement picture and a size of an advertisement display area in a display, whether to crop the first advertisement picture.

Each time the second terminal displays an advertisement, a location and a size of an advertisement display area in a display of the second terminal are usually preset. For example, it may be preset that an advertisement displayed when the terminal enables an application A is a full-screen advertisement. In this case, the advertisement display area is the entire display. For another example, it may be preset that an advertisement played by the terminal in a playback pause interface of a video application B is an interstitial advertisement. In this case, the advertisement display area is an area that is located in a center of the display and whose size is 300×400.

Figure 17:
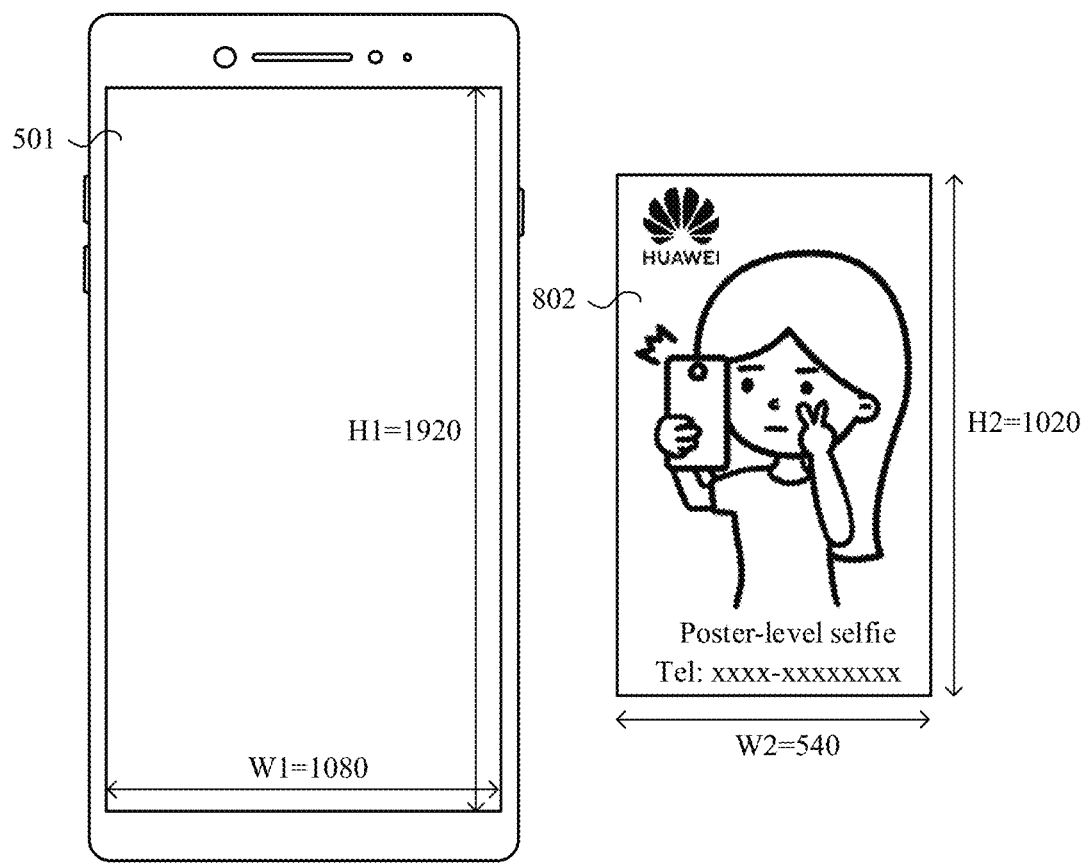
FIG. 17 is a schematic scenario diagram 2 of a method for displaying an advertisement picture according to an embodiment of this application.

As shown in FIG. 17, for example, an advertisement display area 501 in which the first advertisement picture 802 is displayed this time is the entire display. After downloading the first advertisement picture 802, the second terminal may obtain an aspect ratio (W1/H1) of the advertisement display area 501 (that is, the display) and an aspect ratio (W2/H2) of the first advertisement picture 802. If the aspect ratio (W2/H2) of the first advertisement picture 802 is equal to the aspect ratio (W1/H1) of the advertisement display area 501, it indicates that when being displayed, the first advertisement picture 802 can be fully filled in the advertisement display area 501 by proportional scaling. Therefore, the second terminal can determine that the first advertisement picture 802 does not need to be cropped in this case.

Correspondingly, if the aspect ratio (W2/H2) of the first advertisement picture 802 is not equal to the aspect ratio (W1/H1) of the advertisement display area 501, it indicates that when being displayed, the first advertisement picture 802 cannot be fully filled in the advertisement display area 501 by proportional scaling. Therefore, the second terminal can determine that the first advertisement picture 802 needs to be cropped in this case.

Alternatively, if the aspect ratio (W2/H2) of the first advertisement picture 802 is not equal to the aspect ratio (W1/H1) of the advertisement display area 501, the second terminal may further compare a difference between W2/H2 and W1/H1. If the difference between W2/H2 and W1/H1 is less than a preset value, it indicates that the aspect ratio of the first advertisement picture 802 is close to the aspect ratio of the advertisement display area 501, and the second terminal may non-proportionally scale the first advertisement picture 802 to display the first advertisement picture 802 in the advertisement display area 501. If the difference between W2/H2 and W1/H1 is greater than or equal to a preset value, it indicates that the difference between the aspect ratio of the first advertisement picture 802 and the aspect ratio of the advertisement display area 501 is relatively large. If the second terminal forces the first advertisement picture 802 to be displayed in full screen on the display, picture content in the first advertisement picture 802 may be severely distorted. Therefore, the second terminal can determine that the first advertisement picture 802 needs to be cropped in this case.

S1505: If determining to crop the first advertisement picture, the second terminal crops the first advertisement picture based on the location information of the key information area, to obtain a cropped second advertisement picture.

An example in which a size of the first advertisement picture 802 is 540×1020 and resolution of the display of the second terminal is 1080×1920 (that is, a size of the advertisement display area 501 is 1080×1920) is still used for description. If the second terminal determines, in step S704, that the first advertisement picture 802 needs to be cropped, to enable a cropped first advertisement picture 802 (referred to as the second advertisement picture in this embodiment of this application) to be displayed in full screen on the display of the second terminal, an aspect ratio of the second advertisement picture should be equal to the aspect ratio of the advertisement display area 501, and each aspect ratio is 9:16.

Figure 18:
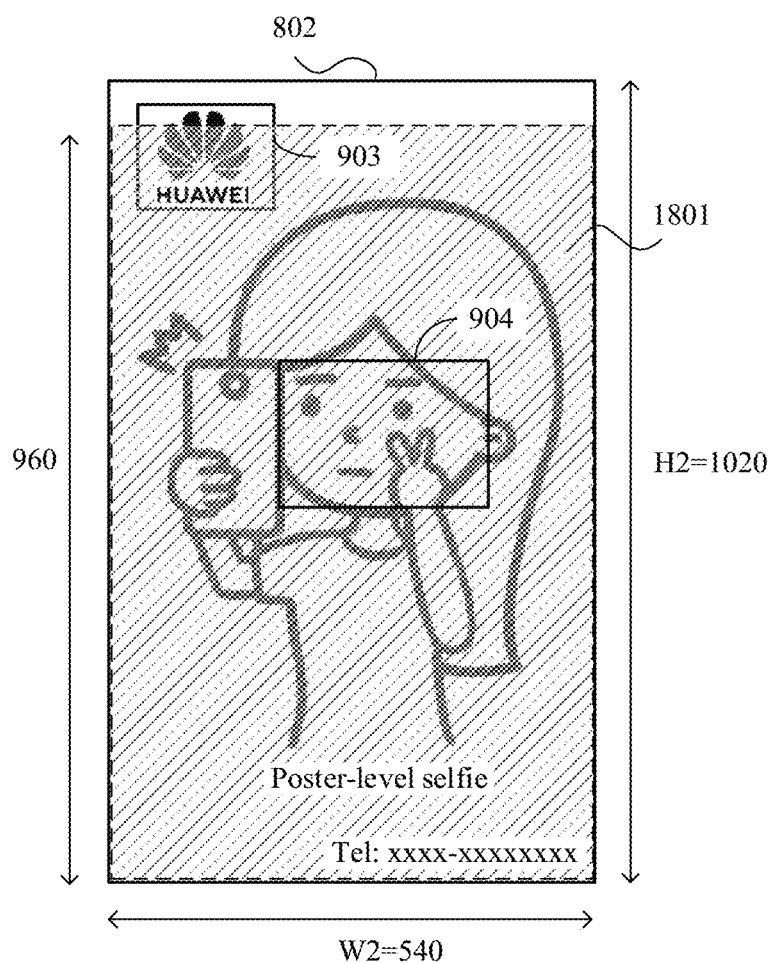
FIG. 18 is a schematic scenario diagram 3 of a method for displaying an advertisement picture according to an embodiment of this application.

Further, as shown in FIG. 18, the second terminal may determine, based on the size of the first advertisement picture 802, a maximum rectangle (the rectangle may also be referred to as an adjustment rectangle) whose aspect ratio is 9:16 and that is included in the first advertisement picture 802. For example, when a size of the first advertisement picture 802 is 540×1020, a maximum rectangle whose aspect ratio is 9:16 and that is in a 540×1020 rectangle is a 540×960 rectangle 1801. A size of the rectangle 1801 is a size of the second advertisement picture obtained after the first advertisement picture 802 is cropped.

In addition, still as shown in FIG. 18, because the advertisement information of the first advertisement picture 802 includes the location information of the key information area, the second terminal may determine that key information areas in the first advertisement picture 802 are an area in which the first mark box 903 is located and an area in which the second mark box 904 is located. A vertex A1 in a top left corner of the first mark box 903 is (100, 50), and a vertex B1 in a lower right corner of the first mark box 903 is (200, 200). A vertex A2 in a top left corner of the second mark box 904 is (180, 260), and a vertex B2 in a lower right corner of the second mark box 904 is (420, 580).

Figure 19:
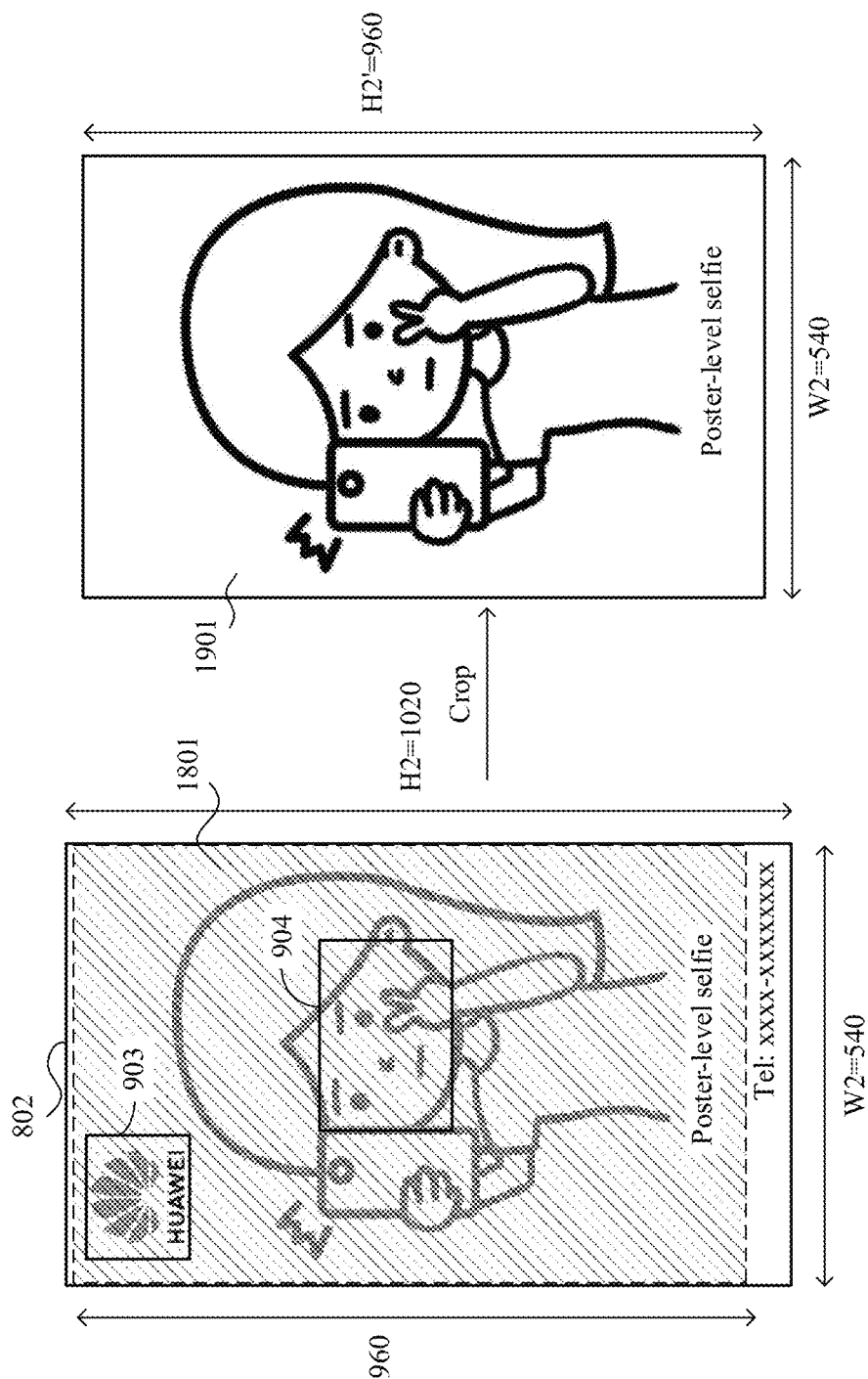
FIG. 19 is a schematic scenario diagram 4 of a method for displaying an advertisement picture according to an embodiment of this application.

To prevent key information in the key information areas from being cut out when the first advertisement picture 802 is being cropped, as shown in FIG. 19, the second terminal may move a location of the rectangle 1801 in the first advertisement picture 802, until the rectangle 1801 can include the vertex A1 in the top left corner of the first mark box 903 and the vertex B2 in the lower right corner of the second mark box 904. In this case, all the key information areas in the first advertisement picture 802 are located in the rectangle 1801. Further, the second terminal may use four sides of the rectangle 1801 as a cropping line to crop the first advertisement picture 802, to obtain a second advertisement picture 1901 that includes all the key information areas.

The cropping line is a line used to crop the first advertisement picture 802. In this embodiment of this application, the cropping line determined by the second terminal is usually a boundary line of a closed graph, for example, the four sides of the rectangle 1801. A shape of the cropping line is the same as a shape of the advertisement display area 501. In this case, after the first advertisement picture 802 is cropped along the cropping line, the second terminal may retain picture content within the rectangle 1801, to form the second advertisement picture 1901.

It should be noted that, in the foregoing embodiment, an example in which a rectangle is used as a shape of the key information area is used for description. It may be understood that the shape of the key information area may be alternatively a regular shape such as a circle or a triangle, or an irregular shape. No matter what shape the key information area is, the second terminal can obtain the location information of the key information area from the advertisement information sent by the server, to determine a specific location of the key information area in the first advertisement picture 802. In this case, when determining a cropping line, the second terminal may still move a location of the rectangle 1801 according to the foregoing method until the rectangle 1801 can include the key information area in the first advertisement picture 802, and the second terminal may further use four sides of the rectangle 1801 at this time as the cropping line to crop the first advertisement picture 802.

Figure 20:
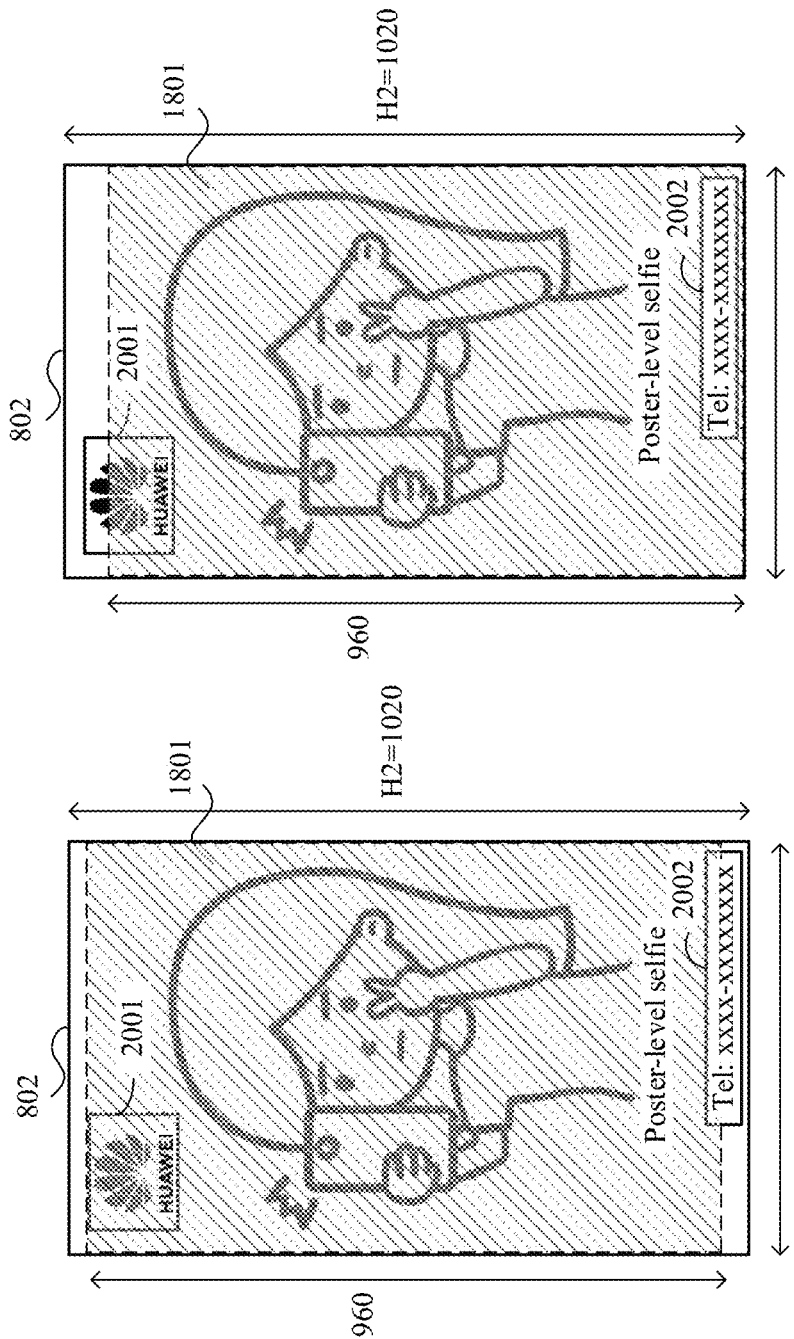
FIG. 20($a$) and FIG. 20($b$) are a schematic scenario diagram 5 of a method for displaying an advertisement picture according to an embodiment of this application.

In some other embodiments, when the second terminal moves the rectangle 1801, the rectangle 1801 may be unable to include all the key information areas in the first advertisement picture 802. For example, the first advertisement picture 802 includes a key information area 2001 and a key information area 2002. As shown in FIG. 20(a), when the rectangle 1801 is moved to include a vertex in a top left corner of the key information area 2001, content of the key information area 2002 cannot be all included in the rectangle 1801. As shown in FIG. 20(b), when the rectangle 1801 is moved to include a vertex in a lower right corner of the key information area 2002, content of the key information area 2001 cannot be all included in the rectangle 1801. In other words, no matter how the first advertisement picture 802 is cropped, there is a problem that the key information in the first advertisement picture 802 is lost.

In this case, the second terminal may preferentially include a key information area with a higher priority in the rectangle 1801 based on a priority sequence between the key information area 2001 and the key information area 2002. Assuming that a priority of the key information area 2001 is higher than a priority of the key information area 2002, as shown in FIG. 20(a), the second terminal may move the rectangle 1801 to a location at which the rectangle 1801 can include a vertex in a top left corner of the key information area 2001, so that the key information area 2001 is completely included in the rectangle 1801. Further, the second terminal may use four sides of the rectangle 1801 at this time as a cropping line to crop the first advertisement picture 802, and retain picture content located in the rectangle 1801 in the first advertisement picture 802, so as to minimize loss of key information that the advertiser considers to be more important.

It should be noted that, in the foregoing embodiment, an example in which a maximum rectangle whose aspect ratio is 9:16 in the first advertisement picture 802 is used as a reference rectangle to describe a method for determining the cropping line by using the reference rectangle in this application. It may be understood that the second terminal may set any rectangle whose aspect ratio is 9:16 and whose size is less than that of the first advertisement picture 802 as a reference rectangle, and determines a cropping line of the first advertisement picture 802 by using the reference rectangle according to the foregoing method.

Figure 21:
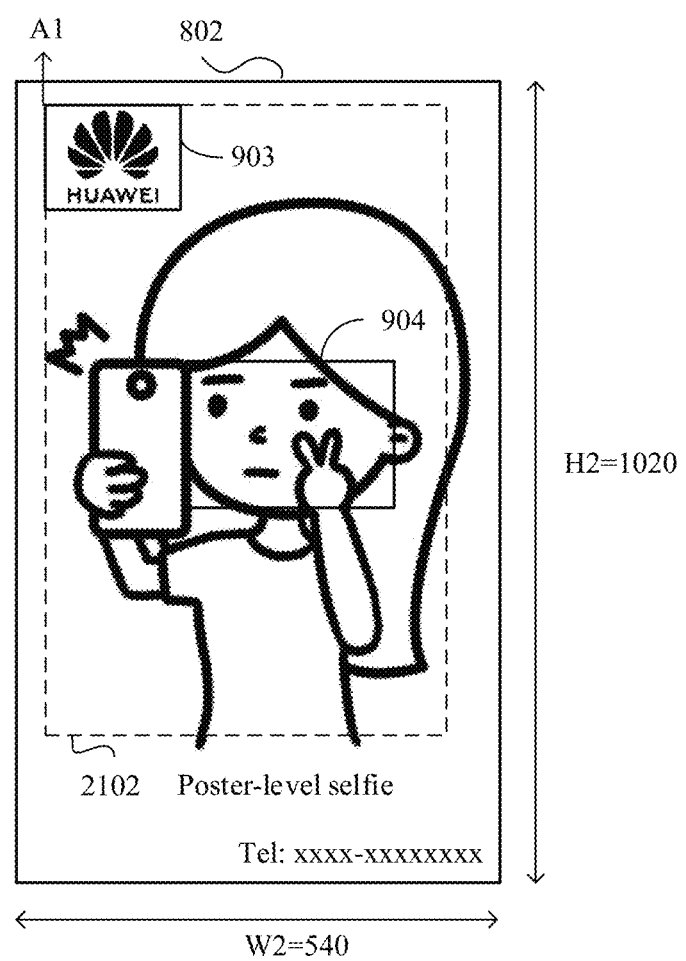
FIG. 21 is a schematic scenario diagram 6 of a method for displaying an advertisement picture according to an embodiment of this application.

In some other embodiments, when cropping the first advertisement picture 802, the second terminal may further first determine, in the first advertisement picture 802, a vertex of the cropped second advertisement picture. For example, as shown in FIG. 21, the second terminal may first determine a key information area with a highest priority in the first advertisement picture 802. For example, the key information area with the highest priority is an area in which the first mark box 903 is located. If the first mark box 903 is close to the top left corner of the first advertisement picture 802, the second terminal may use the vertex A1 in the top left corner of the first mark box 903 as a vertex in a top left corner of the second advertisement picture. Further, the second terminal may generate an adjustment rectangle 2101 based on a 9:16 ratio by using A1 as the vertex in the top left corner of the second advertisement picture. A location of a vertex in a lower right corner of the adjustment rectangle 2101 are adjustable, that is, a size of the adjustment rectangle 2101 are adjustable.

In this case, when the adjustment rectangle 2101 includes all key information areas in the first advertisement picture 802, the second terminal may use four sides of the adjustment rectangle 2101 at this time as a cropping line to crop the first advertisement picture 802, and retain picture content located in the adjustment rectangle 2101, to obtain a second advertisement picture whose size is the same as that of the adjustment rectangle 2101. In this way, the second advertisement picture obtained after the first advertisement picture 802 is cropped includes all the key information areas, that is, the key information in the first advertisement picture 802 is not lost. Alternatively, when the vertex in the lower right corner of the adjustment rectangle 2101 coincides with the vertex in the lower right corner of the first advertisement picture 802, the second terminal may use four sides of the adjustment rectangle 2101 at this time as a cropping line to crop the first advertisement picture 802. In this case, an obtained second advertisement picture includes at least the key information area with the highest priority.

Correspondingly, if the first mark box 903 with the highest priority is close to the upper right corner of the first advertisement picture 802, the second terminal may use a vertex in an upper right corner of the first mark box 903 as a vertex in an upper right corner of the second advertisement picture. If the first mark box 903 with the highest priority is close to the lower right corner of the first advertisement picture 802, the second terminal may use a vertex in a lower right corner of the first mark box 903 as a vertex in a lower right corner of the second advertisement picture. If the first mark box 903 with the highest priority is close to a lower left corner of the first advertisement picture 802, the second terminal may use a vertex in a lower left corner of the first mark box 903 as a vertex in a lower left corner of the second advertisement picture. Further, the second terminal may adjust the size of the adjustment rectangle 2101 and crop the first advertisement picture 802 according to the foregoing method.

S1506: The second terminal displays the second advertisement picture in the advertisement display area.

Figure 22:
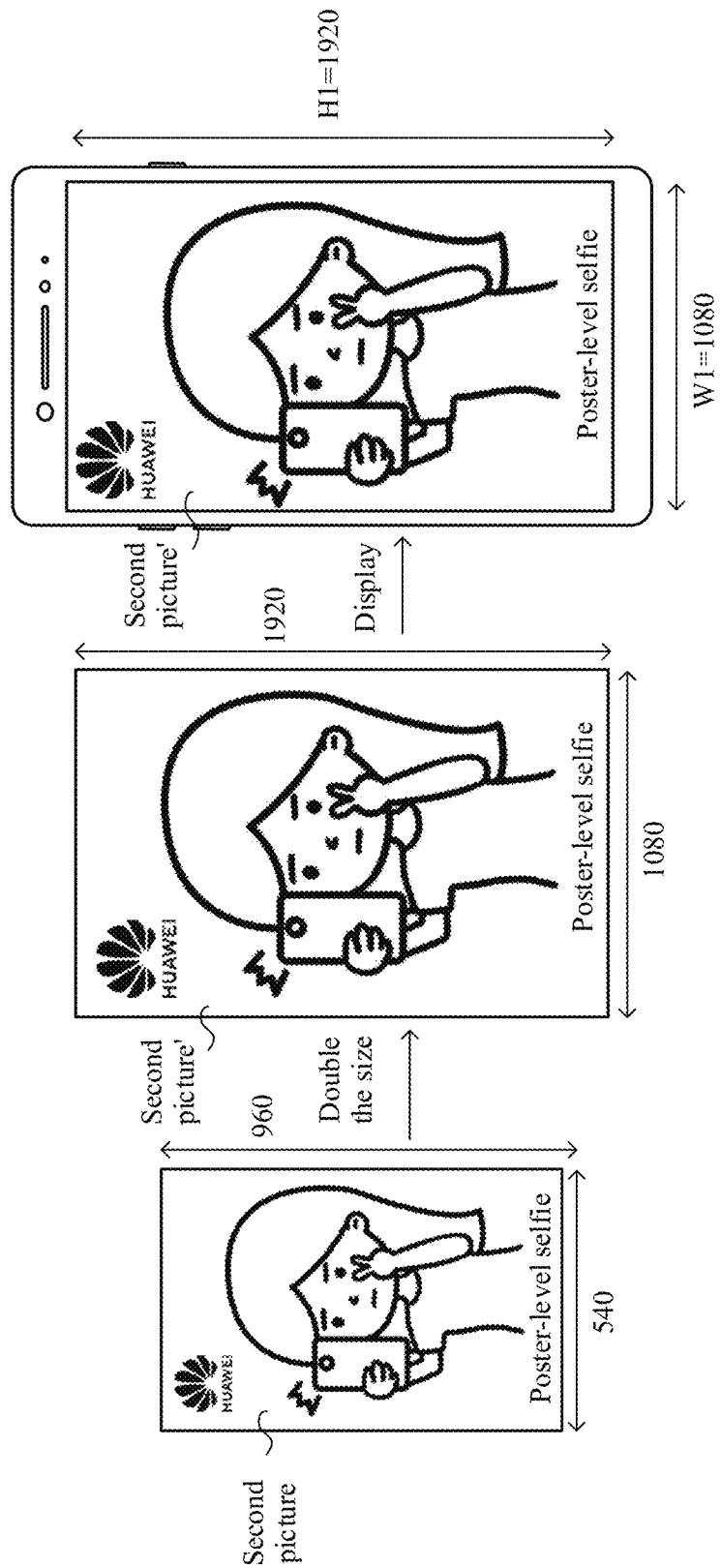
FIG. 22 is a schematic scenario diagram 7 of a method for displaying an advertisement picture according to an embodiment of this application.

As shown in FIG. 22, both aspect ratios of the cropped second advertisement picture 1901 and the advertisement display area 501 (that is, the display) in the second terminal are 9:16. In this case, the second terminal may proportionally scale the second advertisement picture 1901 based on a size relationship between the second advertisement picture 1901 and the advertisement display area 501, and then display the second advertisement picture 1901 in full screen in the advertisement display area 501. That a size of the advertisement display area 501 is 1080×1920 and a size of the second advertisement picture 1901 is 540×960 is still used as an example. The second terminal may learn, through calculation, that the size of the advertisement display area 501 is twice the size of the second advertisement picture 1901. Further, the first terminal may double the size of the second advertisement picture 1901 to obtain a second advertisement picture' whose size is 1080×1920. In this case, both the size of the second advertisement picture' and the size of the advertisement display area 501 are 1080×1920. In this case, the second terminal may display the second advertisement picture' in the advertisement display area 501, so that the second advertisement picture 1901 can be displayed in the advertisement display area 501 in full screen.

Because the second advertisement picture 1901 is proportionally scaled before being displayed in the advertisement display area 501, a relative location relationship in the picture content are not changed in the second advertisement picture' that is finally displayed in the advertisement display area 501 and that is obtained through proportional scaling. In this way, a display effect of the advertisement picture is maximally ensured.

It should be noted that, if the cropped second advertisement picture 1901 has the same size as the advertisement display area 501, the second terminal does not need to proportionally scale the second advertisement picture 1901, but directly displays the second advertisement picture 1901 in the advertisement display area 501, so that the second advertisement picture 1901 can be displayed in the advertisement display area 501 in full screen.

It may be understood that the method for cropping and displaying the first advertisement picture 802 described in the foregoing embodiments is merely used as an example for description. A person skilled in the art may set a method for cropping and displaying the first advertisement picture 802 based on an actual application scenario or actual experience. This is not limited in the embodiments of this application.

Figure 23:
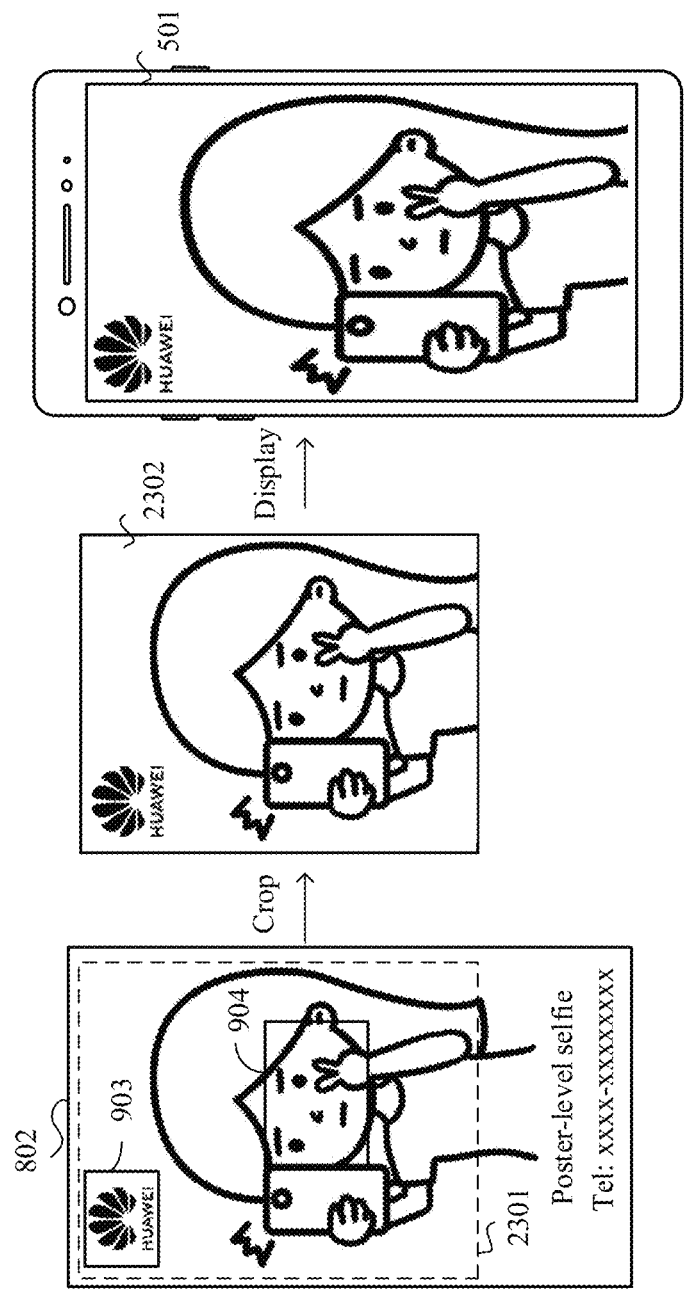
FIG. 23 is a schematic scenario diagram 8 of a method for displaying an advertisement picture according to an embodiment of this application.

For example, as shown in FIG. 23, the second terminal may determine, based on the location information of the key information area carried in the advertisement information of the first advertisement picture 802, that key information areas in the first advertisement picture 802 are an area in which the first mark box 903 is located and an area in which the second mark box 904 is located. Further, a boundary of any rectangle (for example, a rectangle 2301 shown in FIG. 23) that is in the first advertisement picture 802 and that includes both the first mark box 903 and the second mark box 904 may be determined as a cropping line, and a second advertisement picture 2302 including the first mark box 903 and the second mark box 904 is obtained by cropping based on the cropping line.

In this case, still as shown in FIG. 23, when displaying the second advertisement picture 2302 in the advertisement display area 501, the second terminal may completely fill the advertisement display area 501 with the second advertisement picture 2302 by adjusting a size of the second advertisement picture 2302 for display. Certainly, the second terminal may alternatively display the second advertisement picture 2302 at a specific location in the advertisement display area 501. In this case, a cropped second advertisement picture 2302 cannot be fully filled in the advertisement display area 501. This is not limited in the embodiments of this application.

It can be learned that according to the method for displaying an advertisement picture provided in the embodiments of this application, when responding to the advertisement request of the terminal, the server delivers, to the terminal, the location information that is of the key information area in the advertisement picture and that is specified by the advertiser. In this way, when cropping the advertisement picture, the terminal can maximally retain the key information in the advertisement picture based on the location information. This avoids loss of the key information in the advertisement. In addition, when the advertisement picture is cropped, the size of the cropped advertisement picture may further be set to adapt to the size of the advertisement display area. This maximally ensures a display effect of the advertisement picture.

Figure 24:
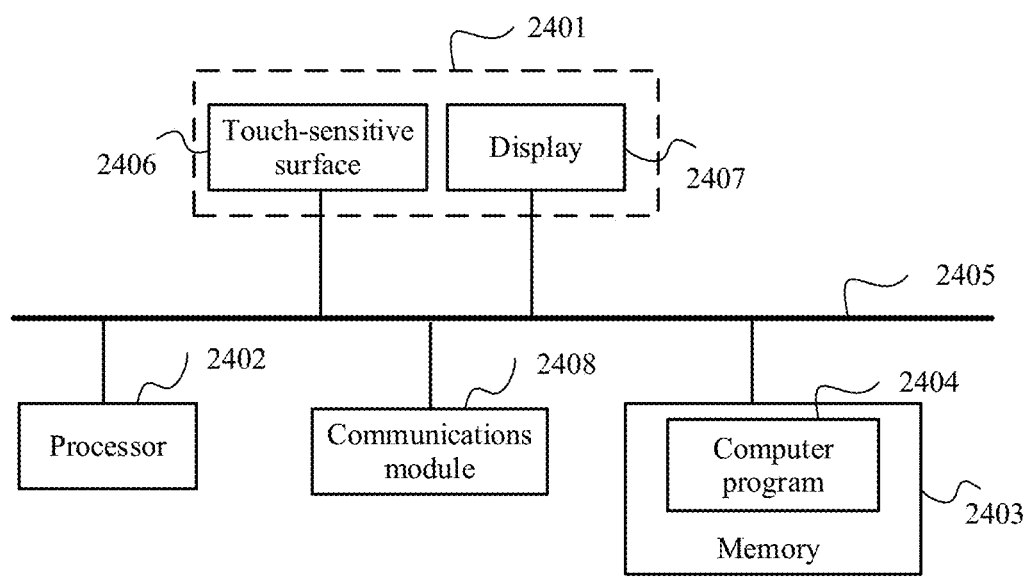
FIG. 24 is a schematic structural diagram 2 of a terminal according to an embodiment of this application.

In some other embodiments of this application, an embodiment of this application discloses a terminal, including a processor, and a memory, a communications module, an input device, and an output device that are connected to the processor. The input device and the output device may be integrated into one device. For example, a touch-sensitive surface may be used as an input device, a display may be used as an output device, and the touch-sensitive surface and the display may be integrated into a touchscreen. In this case, as shown in FIG. 24, the terminal may include a touchscreen 2401, where the touchscreen 2401 includes a touch-sensitive surface 2406 and a display 2407; one or more processors 2402; a memory 2403; a communications module 2408; one or more application programs (not shown); and one or more computer programs 2404. The foregoing components may be connected to each other by using one or more communications buses 2405. The one or more computer programs 2404 are stored in the memory 2403 and configured to be executed by the one or more processors 2402. The one or more computer programs 2404 include an instruction. The instruction may be used to perform steps in FIG. 6, FIG. 15, and corresponding embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method implemented by a terminal, wherein the method comprises:
    obtaining, from an advertisement server, location information of a first key information area in a first advertisement picture;
    obtaining the first advertisement picture;
    cropping the first advertisement picture based on the location information, to obtain a cropped first advertisement picture;
    setting the cropped first advertisement picture as a second advertisement picture, or scaling the cropped first advertisement picture to obtain the second advertisement picture, wherein the second advertisement picture comprises a second key information area and a rectangular third key information area, wherein location information of the third key information area comprises coordinate information of a vertex A1 in a top left corner of the third key information area and coordinate information of a vertex B1 in a lower right corner of the third key information area, wherein a first priority of the third key information area is higher than a second priority of a rectangular fourth key information area of the first advertisement picture, and wherein location information of the fourth key information area comprises coordinate information of a vertex A2 in a top left corner of the fourth key information area and coordinate information of a vertex B2 in a lower right corner of the fourth key information area;
    determining a maximum rectangle in the first advertisement picture having a fourth aspect ratio that is the same as a second aspect ratio of an advertisement display area;
    moving the maximum rectangle to enable a vertex in a top left corner of the maximum rectangle to coincide with the vertex A1;
    setting a boundary line of the maximum rectangle as a cropping line;
    cropping the first advertisement picture based on the cropping line; and
    displaying the second advertisement picture in the advertisement display area of a display of the terminal.

2. The method of claim 1, wherein before obtaining the location information, the method further comprises:
    sending an advertisement request to the advertisement server; and
    receiving advertisement information of the first advertisement picture from the advertisement server in response to the advertisement request, wherein the advertisement information comprises the location information.

3. The method of claim 2, wherein the advertisement information further comprises a download address of the first advertisement picture, and wherein the method further comprises downloading the first advertisement picture based on the download address.

4. The method of claim 1, wherein a first aspect ratio of the second advertisement picture is the same as a second aspect ratio of the advertisement display area.

5. The method of claim 1, further comprising:
   determining, based on the location information, a cropping line of the first advertisement picture, wherein a first shape of the cropping line is the same as a second shape of the advertisement display area;
   cropping the first advertisement picture based on the cropping line; and
   retaining, as the second advertisement picture, a cropped part of the first advertisement picture that has the second shape.

6. The method of claim 5, wherein the location information comprises at least two pieces of coordinate information that indicate boundaries of the first key information area, and wherein the method further comprises:
   determining, in the first advertisement picture, an adjustment rectangle comprising a third aspect ratio that is the same as a second aspect ratio of the advertisement display area;
   adjusting a location and a size of the adjustment rectangle in the first advertisement picture based on the at least two pieces of coordinate information; and
   determining a boundary line of the adjustment rectangle as the cropping line when the adjustment rectangle comprises the first key information area.

7. The method of claim 6, wherein the method further comprises:
   determining the vertex A1 as a vertex in a top left corner of the adjustment rectangle when a horizontal coordinate of the vertex A1 is less than a horizontal coordinate of the vertex A2 and a vertical coordinate of the vertex B1 is less than a vertical coordinate of the vertex B2;
   adjusting a vertex in a lower right corner of the adjustment rectangle based on the second aspect ratio until the vertex in the lower right corner of the adjustment rectangle coincides with a boundary line of the first advertisement picture;
   setting a boundary line of the adjustment rectangle as the cropping line; and
   cropping the first advertisement picture based on the cropping line.

8. The method of claim 1, wherein the first key information area comprises a trademark.

9. The method of claim 1, wherein the first key information area comprises a text message.

10. The method of claim 1, wherein the first key information area comprises a phone number.

11. The method of claim 1, wherein priority of the third key information area is preset by the server.

12. A terminal comprising:
   a display comprising an advertisement display area; and
   a processor coupled to the display and configured to:
      obtain location information of a first key information area in a first advertisement picture from an advertisement server;
      obtain the first advertisement picture;
      crop the first advertisement picture based on the location information to obtain a cropped first advertisement picture;
      set the cropped first advertisement picture as a second advertisement picture, or scale the cropped first advertisement picture to obtain the second advertisement picture, wherein the second advertisement picture comprises a second key information area and a rectangular third key information area, wherein location information of the third key information area comprises coordinate information of a vertex A1 in a top left corner of the third key information area and coordinate information of a vertex B1 in a lower right corner of the third key information area, wherein a first priority of the third key information area is higher than a second priority of a rectangular fourth key information area of the first advertisement picture, wherein location information of the fourth key information area comprises coordinate information of a vertex A2 in a top left corner of the fourth key information area and coordinate information of a vertex B2 in a lower right corner of the fourth key information area;
      determine a maximum rectangle in the first advertisement picture having a fourth aspect ratio that is the same as a second aspect ratio of the advertisement display area;
      move the maximum rectangle to enable a vertex in a top left corner of the maximum rectangle to coincide with the vertex A1;
      set a boundary line of the maximum rectangle as a cropping line;
      crop the first advertisement picture based on the cropping line; and
      display the second advertisement picture in the advertisement display area.

13. The terminal of claim 12, wherein before obtaining the location information, the processor is further configured to:
   send an advertisement request to the advertisement server; and
   receive advertisement information of the first advertisement picture from the advertisement server in response to the advertisement request, wherein the advertisement information comprises the location information.

14. The terminal of claim 13, wherein the advertisement information further comprises a download address of the first advertisement picture, and wherein the processor is further configured to download the first advertisement picture based on the download address.

15. The terminal of claim 12, wherein the first key information area comprises at least one of: a trademark, commodity image, a face image, a text message, or a phone number.

16. A method implemented by a terminal, wherein the method comprises:
   obtaining, from an advertisement server, location information of a first key information area in a first advertisement picture, wherein the first advertisement picture is rectangular, and wherein the location information comprises at least two pieces of coordinate information that indicate boundaries of the first key information area;
   determining, in the first advertisement picture, an adjustment rectangle comprising a third aspect ratio that is the same as a second aspect ratio of an advertisement display area;

adjusting a location and a size of the adjustment rectangle in the first advertisement picture based on the at least two pieces of coordinate information;

determining a boundary line of the adjustment rectangle as a cropping line when the adjustment rectangle comprises the first key information area;

cropping the first advertisement picture based on the cropping line;

setting the cropped first advertisement picture as a second advertisement picture, or scaling the cropped first advertisement picture to obtain the second advertisement picture, wherein the second advertisement picture comprises a second key information area, wherein the first advertisement picture comprises a third key information area and a fourth key information area, wherein the advertisement display area, the third key information area, and the fourth key information area are all rectangles, wherein location information of the third key information area comprises coordinate information of a vertex A1 in a top left corner of the third key information area and coordinate information of a vertex B1 in a lower right corner of the third key information area, wherein location information of the fourth key information area comprises coordinate information of a vertex A2 in a top left corner of the fourth key information area and coordinate information of a vertex B2 in a lower right corner of the fourth key information area;

determining the vertex A1 as a vertex in a top left corner of the adjustment rectangle when a horizontal coordinate of the vertex A1 is less than a horizontal coordinate of the vertex A2 and a vertical coordinate of the vertex B1 is less than a vertical coordinate of the vertex B2;

adjusting a vertex in a lower right corner of the adjustment rectangle based on the second aspect ratio until the vertex in the lower right corner of the adjustment rectangle coincides with a boundary line of the first advertisement picture; and displaying the second advertisement picture in the advertisement display area.

17. The method of claim 15, wherein before obtaining the location information, the method further comprises:

sending an advertisement request to the advertisement server; and receiving advertisement information of the first advertisement picture from the advertisement server in response to the advertisement request, wherein the advertisement information comprises the location information.

18. The method of claim 17, wherein the advertisement information further comprises a download address of the first advertisement picture, and wherein the method further comprises downloading the first advertisement picture based on the download address.

19. The method of claim 15, wherein the first key information area comprises at least one of; a trademark, a commodity image, a face image, a text message, or a phone number.

20. The method of claim 15, wherein a first priority of the third key information area is higher than a second priority of a rectangular fourth key information area of the first advertisement picture, and wherein the second advertisement picture includes at least the third key information area.

* * * * *

UNITED STATES PATENT AND TRADEMARK OFFICE
CERTIFICATE OF CORRECTION

PATENT NO. : 11,682,148 B2
APPLICATION NO. : 17/056516
DATED : June 20, 2023
INVENTOR(S) : Yang Li, Yiliang He and Huangang Pang It is certified that error appears in the above-identified patent and that said Letters Patent is hereby corrected as shown below:

In the Claims

Claim 17, Column 36, Line 9: "claim 15" should read "claim 16"

Claim 19, Column 36, Line 22: "claim 15" should read "claim 16"

Claim 20, Column 36, Line 26: "claim 15" should read "claim 16"

Signed and Sealed this
Eighth Day of August, 2023

Katherine Kelly Vidal
*Director of the United States Patent and Trademark Office*